（12) United States Patent
Takahashi et al.

(10) Patent No.: US 11,973,378 B2
(45) Date of Patent: Apr. 30, 2024

(54) ROTOR, MOTOR, FAN, AIR CONDITIONER, AND MANUFACTURING METHOD OF ROTOR

(71) Applicant: Mitsubishi Electric Corporation, Tokyo (JP)

(72) Inventors: Ryogo Takahashi, Tokyo (JP); Hiroki Aso, Tokyo (JP); Takaya Shimokawa, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 443 days.

(21) Appl. No.: 17/414,244

(22) PCT Filed: Dec. 20, 2018

(86) PCT No.: PCT/JP2018/046967
§ 371 (c)(1),
(2) Date: Jun. 15, 2021

(87) PCT Pub. No.: WO2020/129210
PCT Pub. Date: Jun. 25, 2020

(65) Prior Publication Data
US 2022/0029486 A1     Jan. 27, 2022

(51) Int. Cl.
*H02K 1/30*     (2006.01)
*F04D 25/06*     (2006.01)
(Continued)

(52) U.S. Cl.
CPC ............ *H02K 1/30* (2013.01); *F04D 25/06* (2013.01); *F24F 1/0029* (2013.01); *F24F 1/38* (2013.01);
(Continued)

(58) Field of Classification Search
CPC .......... H02K 1/30; H02K 1/276; H02K 7/003; H02K 2213/03
See application file for complete search history.

(56) References Cited

U.S. PATENT DOCUMENTS 5,053,664 A * 10/1991 Kikuta ................. H02K 5/12
                                                 310/131
9,041,269 B2 * 5/2015 Kato ..................... H02K 5/1732
                                                310/156.53

(Continued)

FOREIGN PATENT DOCUMENTS

| JP | 2000-023444 A | 1/2000 |
| JP | 2005-102390 A | 4/2005 |

(Continued)

OTHER PUBLICATIONS

Office Action dated Nov. 9, 2021 in connection with counterpart Japanese Patent Application No. 2020-560722 as well as a machine English translation.

(Continued)

*Primary Examiner* — Robert W Horn
(74) *Attorney, Agent, or Firm* — POSZ LAW GROUP, PLC

(57) ABSTRACT

A rotor includes a shaft made of a stainless steel, an annular rotor core surrounding the shaft from an outer side in a radial direction about a center axis of the shaft, a magnet attached to the rotor core, and a separating portion provided between the shaft and the rotor core and having electric insulation property. The magnet constitutes a first magnetic pole, and a part of the rotor core constitutes a second magnetic pole. The rotor core has an inner circumference facing the shaft and an outer circumference opposite to the inner circumference. A radius R1 of the shaft and a maximum distance R2 from the center axis to the outer circumference of the rotor core satisfy $R1/R2 \geq 0.20$.

32 Claims, 16 Drawing Sheets

(51) Int. Cl.
  *F24F 1/0029* (2019.01)
  *F24F 1/38* (2011.01)
  *H02K 1/276* (2022.01)
  *H02K 7/00* (2006.01)
  *H02K 15/03* (2006.01)

(52) U.S. Cl.
  CPC .............. *H02K 1/276* (2013.01); *H02K 7/003* (2013.01); *H02K 15/03* (2013.01); *H02K 2213/03* (2013.01)

(56) References Cited

U.S. PATENT DOCUMENTS

| | | | |
|---|---|---|---|
| 9,484,792 B2* | 11/2016 | Utsumi | H02K 1/2746 |
| 9,653,952 B2* | 5/2017 | Yamada | H02K 29/03 |
| 10,763,712 B2* | 9/2020 | Takahashi | H02K 1/2706 |
| 11,190,069 B2* | 11/2021 | Oikawa | H02K 1/146 |
| 11,342,814 B2* | 5/2022 | Shimokawa | H02K 11/215 |
| 11,456,632 B2* | 9/2022 | Shimokawa | H02K 15/03 |
| 11,710,994 B2* | 7/2023 | Shinji | H02K 1/276 310/156.01 |
| 2011/0148240 A1* | 6/2011 | Koide | H02K 29/03 310/201 |
| 2013/0183175 A1* | 7/2013 | Irie | F04C 2/102 310/156.53 |
| 2020/0067358 A1 | 2/2020 | Takahashi et al. | |
| 2021/0203201 A1* | 7/2021 | Sørensen | F04D 29/20 |
| 2022/0029486 A1* | 1/2022 | Takahashi | F04D 25/0606 |

FOREIGN PATENT DOCUMENTS

| | | |
|---|---|---|
| JP | 2005-229767 A | 8/2005 |
| JP | 2015-092828 A | 5/2015 |
| WO | 2018/134988 A1 | 7/2018 |

OTHER PUBLICATIONS

International Search Report dated Mar. 26, 2019, in corresponding International Application PCT/JP2018/046967 (and English translation).

* cited by examiner

ROTOR, MOTOR, FAN, AIR CONDITIONER, AND MANUFACTURING METHOD OF ROTOR

CROSS REFERENCE TO RELATED APPLICATION

This application is a U.S. national stage application of International Patent Application No. PCT/JP2018/046967 filed on Dec. 20, 2018, the disclosure of which is incorporated herein by reference.

TECHNICAL FIELD

The present invention relates to a rotor, a motor, a fan, an air conditioner, and a manufacturing method of the rotor.

BACKGROUND

Recently, there has been developed a consequent pole rotor which includes a first magnetic pole constituted by a magnet embedded in a rotor core and a second magnetic pole constituted by a portion of the rotor core adjacent to the magnet (see Patent Reference 1).

PATENT REFERENCE

Patent Reference 1

Japanese Patent Application Publication No. 2015-92828 (see FIG. 2).

In the consequent pole rotor, a magnetic flux of the rotor core tends to flow to a shaft because no magnet is provided in the second magnetic pole. When such magnetic flux leakage to the shaft occurs, motor efficiency decreases. Moreover, a current may flow from the rotor core to the shaft, and may cause damage to bearings, which is called electrolytic corrosion.

SUMMARY

The present invention is made to solve the above problems, and is intended to suppress magnetic flux leakage to a shaft in a consequent pole rotor and to suppress electrolytic corrosion.

A rotor of the present invention includes a shaft made of stainless steel, an annular rotor core surrounding the shaft from an outer side in a radial direction about a center axis of the shaft, a magnet attached to the rotor core, and a separating portion provided between the shaft and the rotor core and having electric insulation property. The magnet constitutes a first magnetic pole, and a part of the rotor core constitutes a second magnetic pole. The rotor core has an inner circumference facing the shaft and an outer circumference opposite to the inner circumference. A radius R1 of the shaft and a maximum distance R2 from the center axis to the outer circumference of the rotor core satisfy $R1/R2 \geq 0.20$.

A rotor of the present invention includes a shaft made of a resin, an annular rotor core surrounding the shaft from an outer side in a radial direction about a center axis of the shaft, a magnet attached to the rotor core, a separating portion provided between the shaft and the rotor core and having electric insulation property. The magnet constitutes a first magnetic pole, and a part of the rotor core constitutes a second magnetic pole. The rotor core has an inner circumference facing the shaft and an outer circumference opposite to the inner circumference. A radius R1 of the shaft and a maximum distance R2 from the center axis to the outer circumference of the rotor core satisfy $R1/R2 \geq 0.49$.

A rotor of the present invention includes a shaft made of a ceramics, an annular rotor core surrounding the shaft from an outer side in a radial direction about a center axis of the shaft, a magnet attached to the rotor core, and a separating portion provided between the shaft and the rotor core and having electric insulation property. The magnet constitutes a first magnetic pole, and a part of the rotor core constitutes a second magnetic pole. The rotor core has an inner circumference facing the shaft and an outer circumference opposite to the inner circumference. A radius R1 of the shaft and a maximum distance R2 from the center axis to the outer circumference of the rotor core satisfy $R1/R2 \geq 0.40$.

According to the present invention, since the shaft is made of a stainless steel, a resin, or a ceramics, it is possible to suppress magnetic flux leakage to the shaft. Further, since the separating portion having electric insulation property is provided between the shaft and the rotor core, it is possible to suppress electrolytic corrosion caused by a current flowing through the shaft. Since the radius R1 of the shaft and the maximum distance R2 from the center axis of the shaft to the outer circumference of the rotor core satisfy the above-described relation, sufficient strength of the shaft can be obtained.

DETAILED DESCRIPTION

An embodiment of the present invention will be described in detail below with reference to the drawings. The present invention is not limited to the embodiment.

First Embodiment (Configuration of Motor 1)

Figure 1:
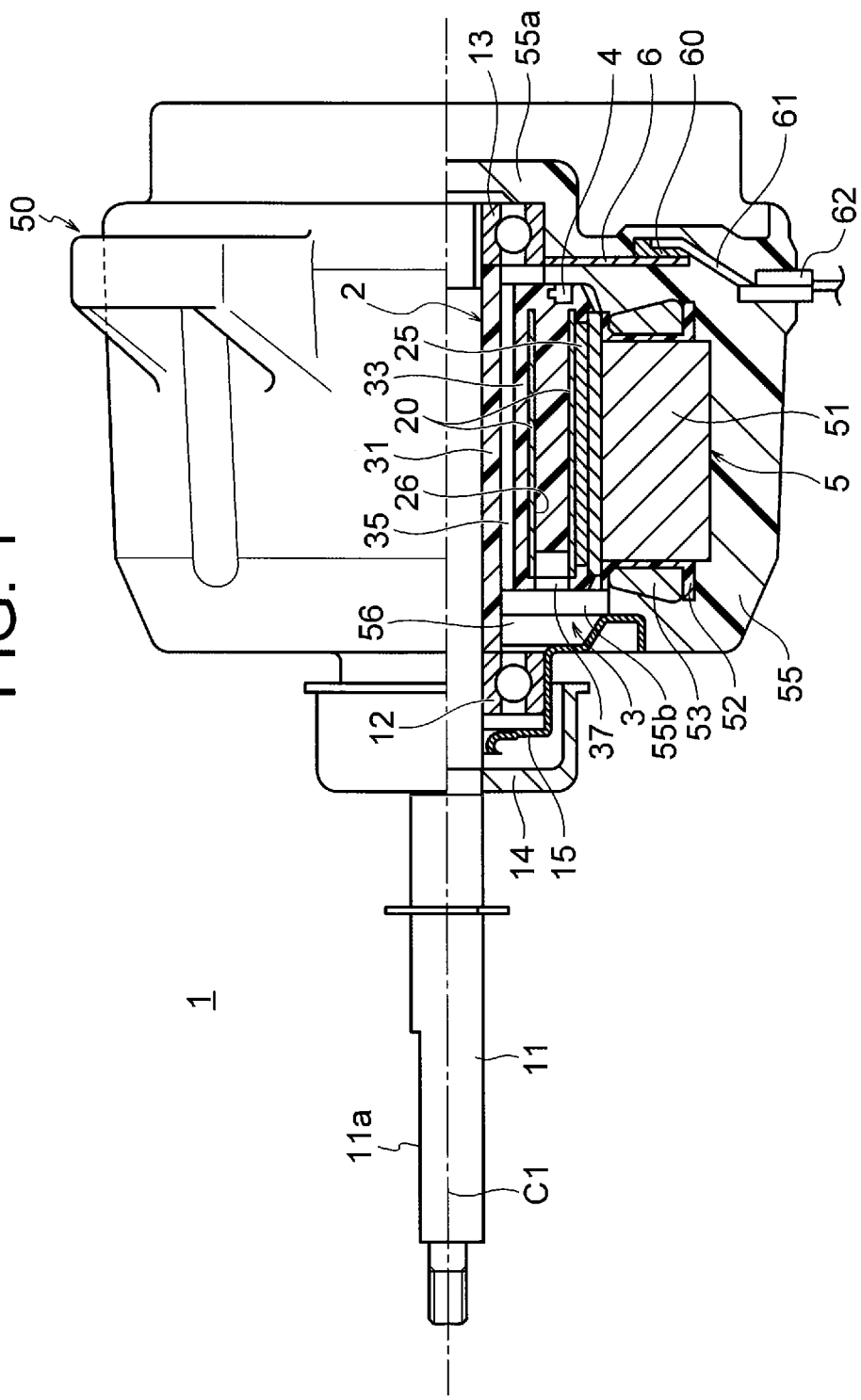
FIG. 1 is a partial sectional view illustrating a motor according to a first embodiment.

FIG. 1 is a longitudinal sectional view illustrating a motor 1 according to a first embodiment of the present invention. The motor 1 is, for example, a brushless DC motor that is used in a fan of an air conditioner and is driven by an inverter. The motor 1 is an IPM (Interior Permanent Magnet) motor with magnets 25 embedded in a rotor 2.

The motor 1 includes the rotor 2 having a shaft 11 and a mold stator 50 surrounding the rotor 2. The mold stator 50 includes an annular stator 5 surrounding the rotor 2 and a mold resin portion 55 covering the stator 5. The shaft 11 is a rotation shaft of the rotor 2.

Hereinafter, a direction of a center axis C1 of the shaft 11 is referred to as an "axial direction". A circumferential direction (indicated by an arrow S in FIG. 2 and the like) about the center axis C1 of the shaft 11 is referred to as a "circumferential direction". A radial direction about the center axis C1 of the shaft 11 is referred to as a "radial direction". Further, a sectional view in a plane parallel to the axial direction is referred to as a "longitudinal-sectional view".

The shaft 11 protrudes from the mold stator 50 to the left in FIG. 1. A blade 505 (FIG. 15(A)) of a fan, for example, is attached to an attachment portion 11a formed on the protruding portion of the shaft 11. Therefore, the protruding side (the left side in FIG. 1) of the shaft 11 is referred to as a "load side", and the opposite side (the right side in FIG. 1) is referred to as a "counter-load side".

(Configuration of Mold Stator 50)

The mold stator 50 includes the stator 5 and the mold resin portion 55 as described above. The stator 5 surrounds the rotor 2 from the outer side in the radial direction. The stator 5 includes a stator core 51, an insulating portion (an insulator) 52 provided on the stator core 51, and a coil (a winding) 53 wound on the stator core 51 via the insulating portion 52.

The mold resin portion 55 is made of a thermosetting resin such as BMC (bulk molding compound). The mold resin portion 55 includes a bearing support 55a on one side in the axial direction (in this example, the counter-load side) and an opening 55b on the other side (in this example, the load side). The rotor 2 is inserted into a hollow portion 56 inside the mold stator 50 through the opening 55b.

A bracket 15 made of a metal is attached to the opening 55b of the mold resin portion 55. One bearing 12 that supports the shaft 11 is held by the bracket 15. A cap 14 for preventing intrusion of water or the like is attached outside the bracket 15. The bearing support 55a of the mold resin portion 55 has an inner circumferential surface having a cylindrical shape. The other bearing 13 supporting the shaft 11 is held on the inner circumferential surface of the bearing support 55a.

Figure 2:
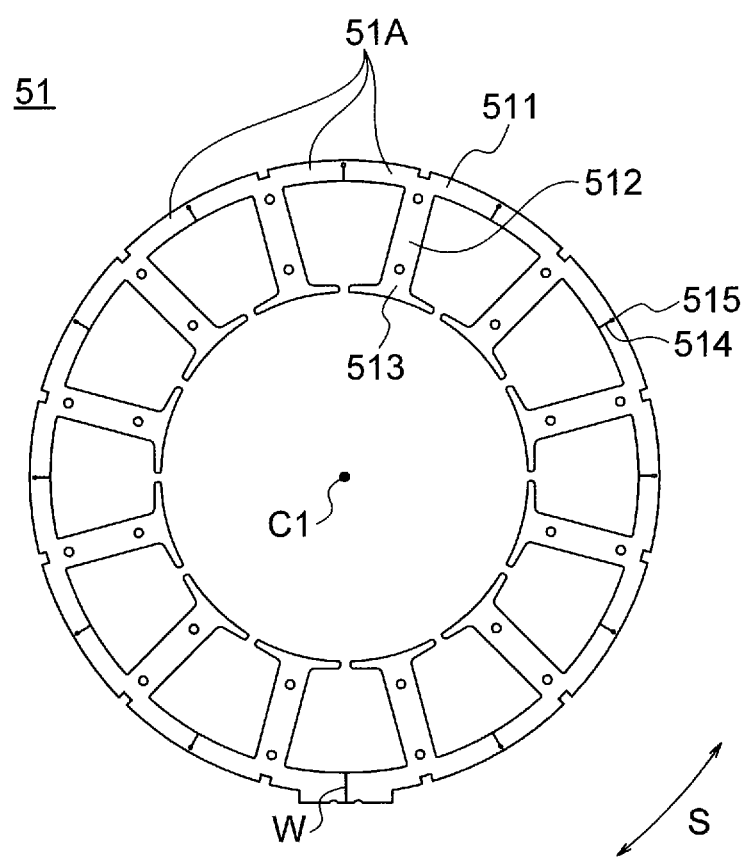
FIG. 2 is a plan view illustrating a stator core according to the first embodiment.

FIG. 2 is a plan view illustrating the stator core 51. The stator core 51 includes a plurality of stacking elements that are stacked in the axial direction and are fixed together by crimping, welding, bonding, or the like. The stacking elements are electromagnetic steel sheets, for example. The stator core 51 includes a yoke 511 that extends annularly in the circumferential direction about the center axis C1 and a plurality of teeth 512 extending inward in the radial direction (toward the center axis C1) from the yoke 511. A tooth tip end 513 on an inner side of each tooth 512 in the radial direction faces the outer circumferential surface of the rotor 2 (FIG. 1). The number of the teeth 512 is 12 in this example, but is not limited to 12.

The stator core 51 is divided into a plurality of (in this example, 12) split cores 51A each including one tooth 512 in this example. The split cores 51A are divided by split surfaces 514 formed in the yoke 511. Each split surface 514 extends from the inner circumferential surface of the yoke 511 to an outer side in the radial direction. A thin portion 515 that is plastically deformable is formed between a terminal end of the split surface 514 and the outer circumferential surface of the yoke 511. Because of plastic deformation of the thin portions 515, the stator core 51 can be extended in a band shape.

This configuration makes it possible to wind the coil 53 around the teeth 512 in a state where the stator core 51 is extended in a band shape. After the coil 53 is wound, the band-shaped stator core 51 is assembled into an annular shape, and both ends (indicated by reference character W in FIG. 2) of the stator core 51 are welded. The stator core 51 is not limited to a combination of the split cores and may have an integrated configuration.

In FIG. 1, the insulating portion 52 is made of, for example, a thermoplastic resin such as PBT (polybutylene terephthalate). The insulating portion 52 is formed by integrally molding the thermoplastic resin with the stator core 51 or by assembling a molded body of the thermoplastic resin to the stator core 51.

The coil 53 is formed by winding a magnetic wire around the teeth 512 (FIG. 2) via the insulating portion 52. The insulating portion 52 has walls on the inner side and the outer side of the coil 53 in the radial direction, and guides the coil 53 from both sides in the radial direction.

A substrate 6 is disposed on one side in the axial direction (in this example, the counter-load side) with respect to the stator 5. The substrate 6 is a printed circuit board on which a driving circuit 60 such as a power transistor for driving the motor 1, a magnetic sensor, and the like are mounted and lead wires 61 are arranged. The lead wires 61 on the substrate 6 are pulled out to the outside of the motor 1 through a lead wire outlet part 62 attached to an outer circumferential portion of the mold resin portion 55.

The bracket 15 is press-fitted into an annular portion provided on the outer circumferential edge of the opening 55b of the mold resin portion 55. The bracket 15 is formed of a metal having electric conductivity such as, for example, a galvanized steel sheet, but is not limited thereto. The cap 14 is attached outside the bracket 15 and prevents intrusion of water or the like into the bearing 12.

(Configuration of Rotor 2)

Figure 3:
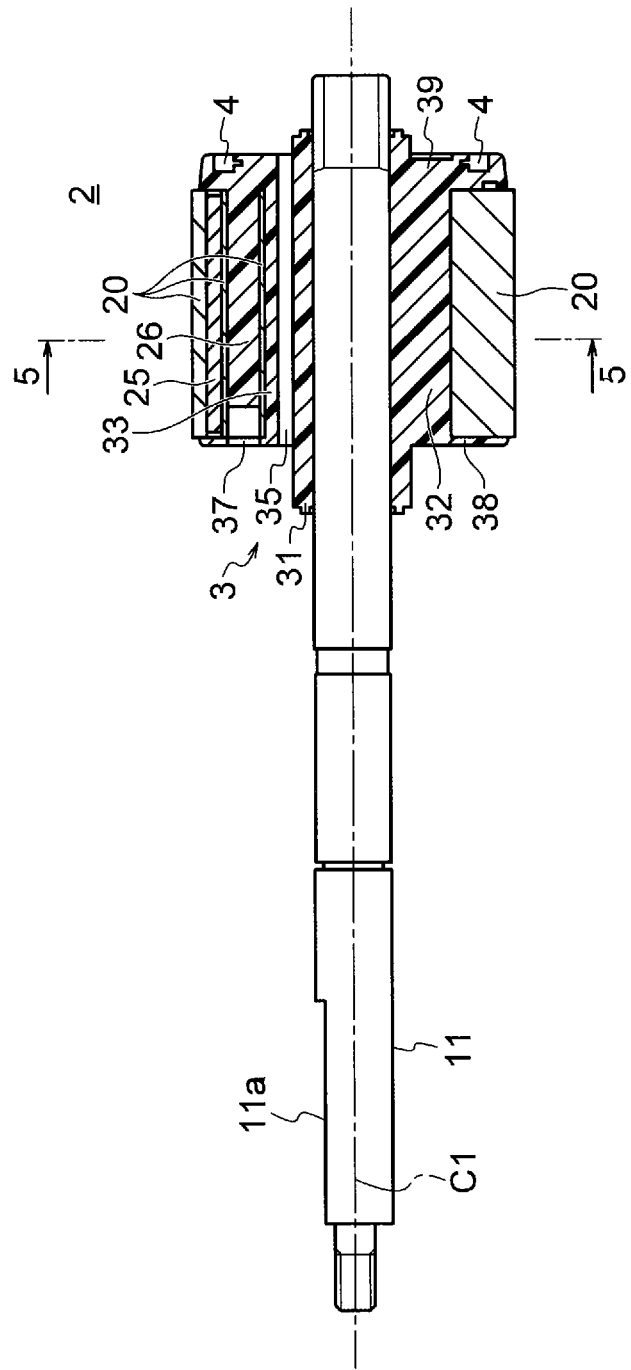
FIG. 3 is a longitudinal sectional view illustrating a rotor according to the first embodiment.
Figure 4:
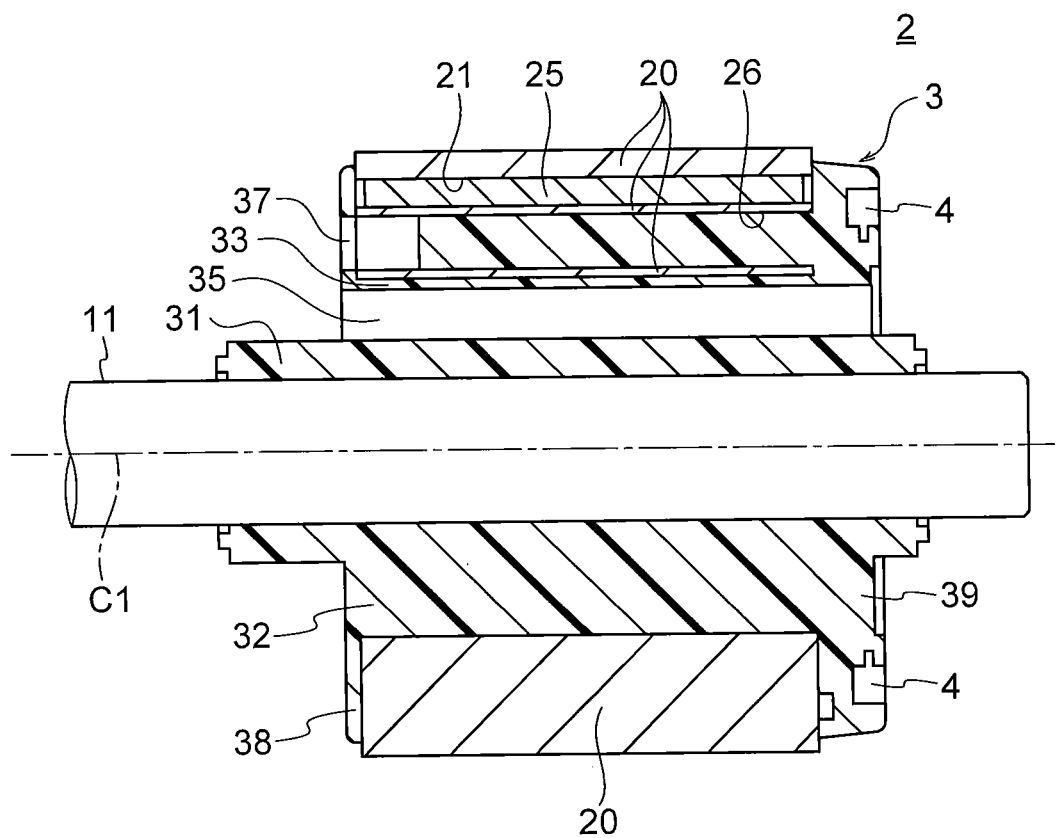
FIG. 4 is an enlarged longitudinal sectional view illustrating the rotor according to the first embodiment.
Figure 5:
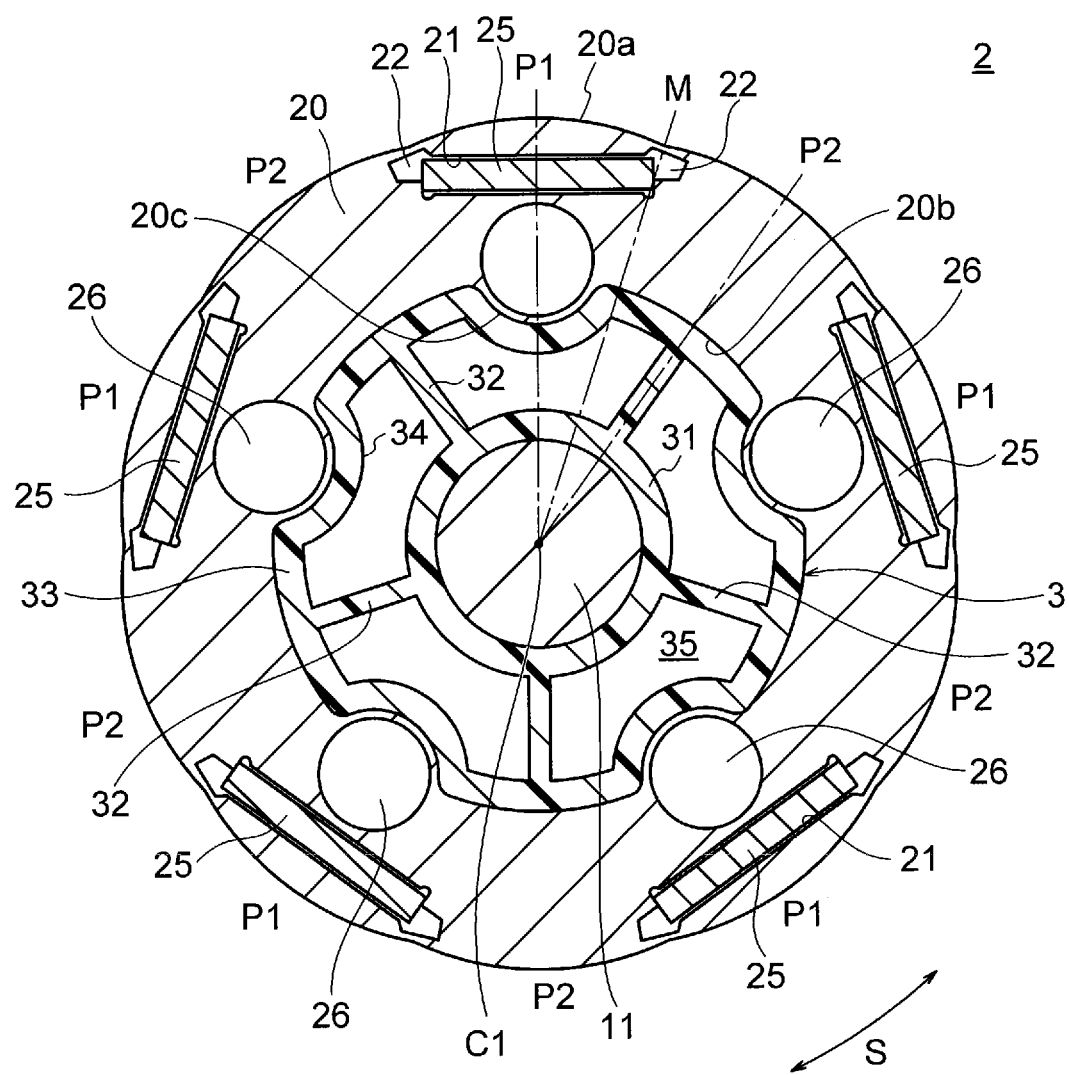
FIG. 5 is a sectional view illustrating the rotor according to the first embodiment.

FIG. 3 is a longitudinal sectional view illustrating the rotor 2. FIG. 4 is an enlarged longitudinal sectional view illustrating a part of the rotor 2. FIG. 5 is a sectional view taken along line 5-5 in FIG. 3 as seen in the direction indicated by arrows.

As illustrated in FIG. 5, the rotor 2 includes the shaft 11 that is a rotation shaft, a rotor core 20 provided on the outer side in the radial direction with respect to the shaft 11 and apart from the shaft 11, a plurality of magnets 25 embedded in the rotor core 20, and a separating portion 3 provided between the shaft 11 and the rotor core 20. The number of magnets 25 is five in this example. The magnets 25 are also referred to as main magnets or rotor magnets.

The shaft 11 is made of a nonmagnetic material such as a stainless steel (SUS304). Magnetic flux leakage from the rotor core 20 to the shaft 11 is suppressed by forming the shaft 11 of the non-magnetic material. Specific examples of the non-magnetic material will be described later. The shaft 11 has a cross section that is circular about the above-described center axis C1, and has a radius R1.

The rotor core 20 is a member that is annular about the center axis C1. The rotor core 20 has an outer circumference 20*a* and an inner circumference 20*b*. The inner circumference 20*b* faces the shaft 11 at a distance therefrom. The rotor core 20 includes a plurality of stacking elements of a soft magnetic material that are stacked in the axial direction and are fixed together by crimping, welding, bonding, or the like. The stacking elements are, for example, electromagnetic steel sheets each having a thickness of 0.1 mm to 0.7 mm.

The rotor core 20 has a plurality of magnet insertion holes 21 in the circumferential direction. The magnet insertion holes are arranged at equal intervals in the circumferential direction and are disposed at equal distances from the center axis C1. The number of magnet insertion holes 21 is five in this example. The magnet insertion holes 21 are formed along the outer circumference 20*a* of the rotor core 20, and pass through the rotor core 20 in the axial direction.

The magnet 25 is inserted in each magnet insertion hole 21. The magnet 25 is in the form of a flat plate and has a rectangular cross-sectional shape perpendicular to the axial direction. The magnet 25 is a rare earth magnet and is, more specifically, a neodymium sintered magnet mainly containing Nd (neodymium)-Fe (iron)-B (boron). A flux barrier 22 that is an opening is formed at each end of the magnet insertion hole 21 in the circumferential direction. The flux barriers 22 suppress a short circuit of magnetic flux between the adjacent magnets 25.

The magnets 25 are all arranged in such a manner that the same magnetic poles (for example, the N-poles) face the outer circumferential side of the rotor core 20. In the rotor core 20, magnetic poles (for example, the S-poles) opposite to those of the magnets 25 are formed in regions between the magnets 25 adjacent in the circumferential direction.

Therefore, five first magnetic poles P1 (for example, the N-poles) and five second magnetic poles P2 (for example, the S-poles) are alternately arranged in the circumferential direction in the rotor 2. Accordingly, the rotor 2 has 10 magnetic poles. The 10 magnetic poles P1 and P2 of the rotor 2 are arranged at equal intervals in the circumferential direction with a pole pitch of 36 degrees (360 degrees divided by 10).

That is, five magnetic poles (the first magnetic poles P1), which correspond to a half of the 10 magnetic poles P1 and P2 of the rotor 2, are formed by the magnets 25, while the remaining five magnetic poles (the second magnetic poles P2) are formed by the rotor core 20. This configuration is referred to as a consequent pole type. In the following description, when the term "magnetic poles" is simply used, this includes both the first magnetic poles P1 and the second magnetic poles P2.

The outer circumference 20*a* of the rotor core 20 has a so-called flower circle shape in a cross section perpendicular to the axial direction. In other words, the outer circumference 20*a* of the rotor core 20 has such a shape that the outer diameter of the rotor core 20 is maximum at the pole center (that is, the center in the circumferential direction) of each of the magnetic poles P1 and P2 and is minimum at an inter-pole portion M (a portion between adjacent magnetic poles). The outer circumference 20*a* has an arc shape from the pole center to the inter-pole portion M. The outer circumference 20*a* of the rotor core 20 is not limited to the flower circle shape and may be a circular shape. Meanwhile, the inner circumference 20*b* of the rotor core 20 has a circular shape in a cross section perpendicular to the axial direction.

In the consequent pole rotor 2, the number of magnets 25 can be halved as compared with a non-consequent pole rotor having the same number of poles. Since the number of expensive magnets 25 is small, the manufacturing cost of the rotor 2 is reduced.

Although the number of poles of the rotor 2 is 10 in this example, it is sufficient that the number of pols of the rotor 2 is an even number of four or more. Moreover, although one magnet 25 is disposed in each magnet insertion hole 21 in this example, two or more magnets 25 may be disposed in each magnet insertion hole 21. The first magnetic pole P1 may be the S-pole and the second magnetic pole P2 may be the N-pole.

In the consequent pole rotor 2, no magnet is provided in the second magnetic pole P2, and thus the magnetic flux tends to flow to the shaft 11. Forming the shaft 11 by using the non-magnetic material as described above is particularly effective in suppressing magnetic flux leakage in the consequent pole rotor 2.

In the rotor core 20, a plurality of core holes 26 are formed on the inner side of the magnet insertion holes 21 in the radial direction. The number of core holes 26 is, for example, half the number of poles and is five in this example. Core holes 26 are provided to engage with positioning pins 78 in a molding mold 9 (FIG. 13) described later to thereby position the rotor core 20 in the molding mold 9.

The core holes 26 are disposed at equal distances from the center axis C1, and are disposed at the same relative positions with respect to the closest magnetic poles. In this example, each core hole 26 is formed on the inner side of the pole center of the first magnetic pole P1 in the radial direction. This arrangement allows any core holes 26 of the rotor core 20 to engage with the pins 78 of the molding mold 9.

Each core hole 26 is formed on the inner side in the radial direction of the pole center of the first magnetic pole P1 in this example, but may be formed on the inner side in the radial direction of the pole center of the second magnetic pole P2. The cross-sectional shape of the core hole 26 is a circular shape in this example, but may be, for example, a rectangular shape or another cross-sectional shape (see FIG. 17 described later).

In the consequent pole rotor 2, no magnet is provided in the second magnetic pole P2, and thus the magnetic flux from the first magnetic pole P1 tends to be disturbed. The disturbance of magnetic flux leads to imbalance of magnetic force, and causes vibration or noise. By disposing the core hole 26 at the pole center of the first magnetic pole P1 or the second magnetic pole P2, the flow of magnetic flux can be rectified, thereby reducing vibration and noise.

Since the number of core holes 26 is half the number of poles and the position of each core hole 26 in the circumferential direction is coincident with the pole center of the first magnetic pole P1, the weight balance of the rotor core 20 in the circumferential direction is improved. However, the number of core holes 26 is not limited to half the number of poles.

The inner circumference 20b of the rotor core 20 has a circular shape in a cross section perpendicular to the axial direction, but protrusions 20c corresponding to the core holes 26 are formed to protrude inward in the radial direction. Each protrusion 20c is formed in an arc shape along the outer circumference of the core hole 26.

The separating portion 3 is provided between the shaft 11 and the rotor core 20. The separating portion 3 connects the shaft 11 and the rotor core 20 to each other and has electric insulation property. The separating portion 3 is desirably made of a resin, and more desirably made of a thermoplastic resin such as PBT.

The separating portion 3 includes an inner annular portion 31 that is in contact with the outer circumference of the shaft 11, an outer annular portion 33 that is in contact with the inner circumference 20b of the rotor core 20, and a plurality of ribs 32 that connect the inner annular portion 31 and the outer annular portion 33 to each other. The ribs 32 are arranged at equal intervals in the circumferential direction about the center axis C1. The number of ribs 32 is, for example, half the number of poles and is five in this example.

The shaft 11 passes through the inner annular portion 31 of the separating portion 3 in the axial direction. The ribs 32 are arranged at equal intervals in the circumferential direction and extend radially from the inner annular portion 31 to the outer side in the radial direction. Cavities 35 are formed each between the ribs 32 that are adjacent in the circumferential direction. It is desirable that the cavities 35 pass through the rotor 2 in the axial direction.

In this example, the number of ribs 32 is half the number of poles, and the position of each rib 32 in the circumferential direction is coincident with the pole center of the second magnetic pole P2. Therefore, the weight balance of the rotor 2 in the circumferential direction is improved. However, the number of ribs 32 is not limited to half the number of poles. Further, the position of each rib 32 in the circumferential direction may be coincident with the pole center of the first magnetic pole P1.

The separating portion 3 has electric insulation property, and thus the rotor core 20 and the shaft 11 are electrically insulated from each other. As a result, a current flowing from the rotor core 20 to the shaft 11 (referred to as a shaft current) is suppressed. Accordingly, electrolytic corrosion of each of the bearings 12 and 13 (that is, damage to raceway surfaces of an inner ring and an outer ring and rolling surfaces of rolling elements) is suppressed.

Further, the resonance frequency (the natural frequency) of the rotor 2 can be adjusted by changing the length in the radial direction and the width in the circumferential direction of each rib 32 of the separating portion 3. For example, as the length of the rib 32 decreases and the width of the rib 32 increases, the resonance frequency of the rotor 2 increases. As the length of the rib 32 increases and the width of the rib 32 decreases, the resonance frequency of the rotor 2 decreases. Since the resonance frequency of the rotor 2 can be adjusted by the dimensions of each rib 32 in this way, it is possible to suppress torsional resonance of the motor 1 and a blade attached thereto and resonance of an entire unit including a fan. Accordingly, noise can be suppressed.

Moreover, part of the separating portion 3 enters into the core holes 26 of the rotor core 20, as illustrated in FIG. 4. Since part of the separating portion 3 enters into the core holes of the rotor core 20 in this way, misalignment in the circumferential direction between the rotor core 20 and the separating portion 3 can be suppressed.

As illustrated in FIG. 4, the separating portion 3 has an end surface portion 38 that covers one end surface (in this example, a counter-load side end surface) of the rotor core 20 in the axial direction and an end surface portion 39 that covers the other end surface (in this example, a load side end surface) of the rotor core 20 in the axial direction. The end surface portion 38 does not necessarily entirely cover the one end surface of the rotor core 20. It is sufficient that the end surface portion 38 covers at least a part of the one end surface. This is also the same for the end surface portion 39.

Figure 6:
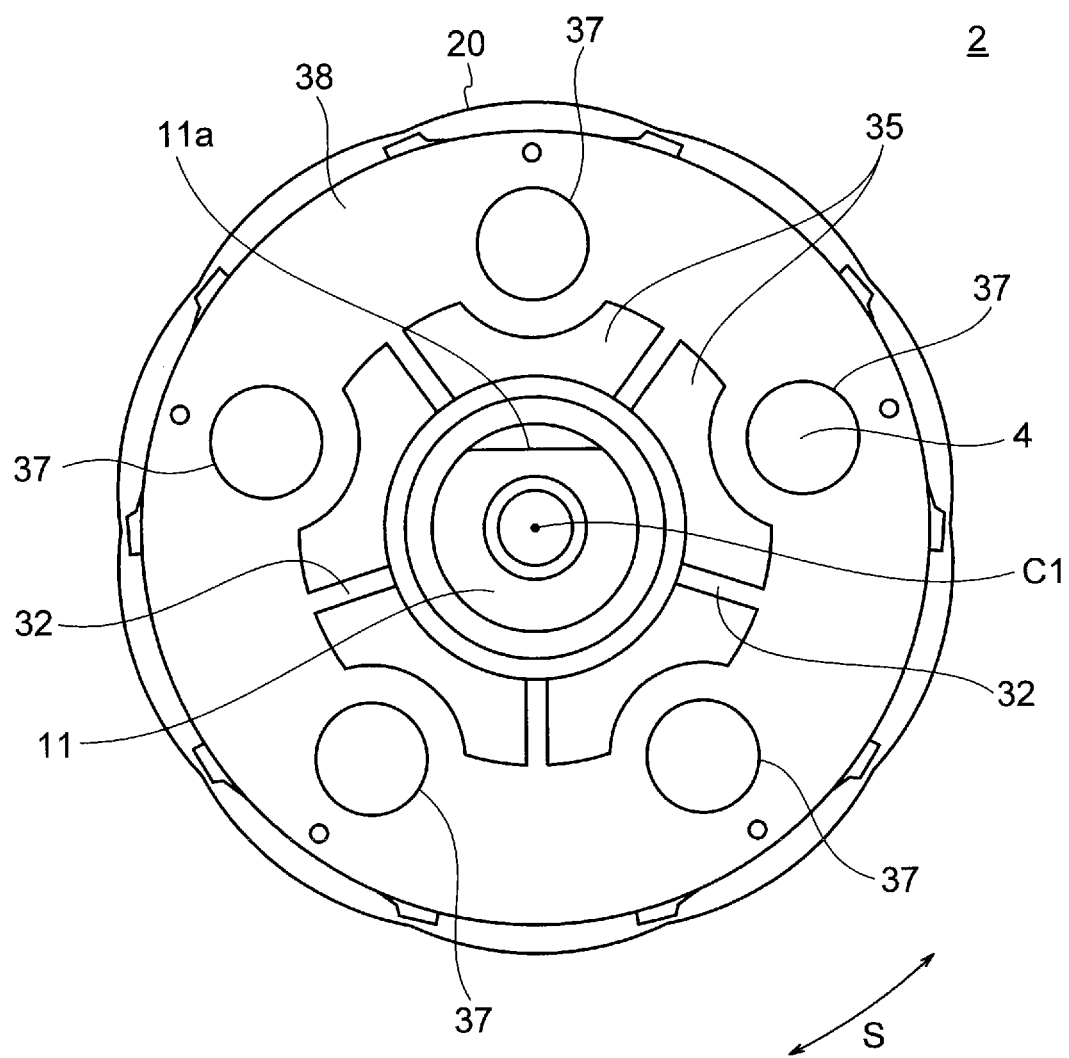
FIG. 6 is a front view illustrating the rotor according to the first embodiment.

FIG. 6 is a diagram of the rotor 2 as seen from the load side, that is, a front view of the rotor 2. As described above, the end surface portion 38 covers the one end surface of the rotor core 20 in the axial direction. In addition, the end surface portion 38 has holes (referred to as resin holes) 37 at positions corresponding to the core holes 26 of the rotor core 20. The resin holes 37 are formed for the reason that the pins 78 of the molding mold 9 (FIG. 13) are engaged with the core holes 26 of the rotor core 20 (and therefore the resin does not enter therein).

Since the pins 78 of the molding mold 9 engage with all the five core holes 26 in this example, the resin holes 37 of the same number as the core holes 26 are formed in the end surface portion 38. However, in a case where the number of pins 78 of the molding mold 9 is smaller than the number of core holes 26, the resin enters into the core holes 26 with which the pins 78 do not engage, and therefore the resin holes 37 of the same number as the pins 78 are formed.

Figure 7:
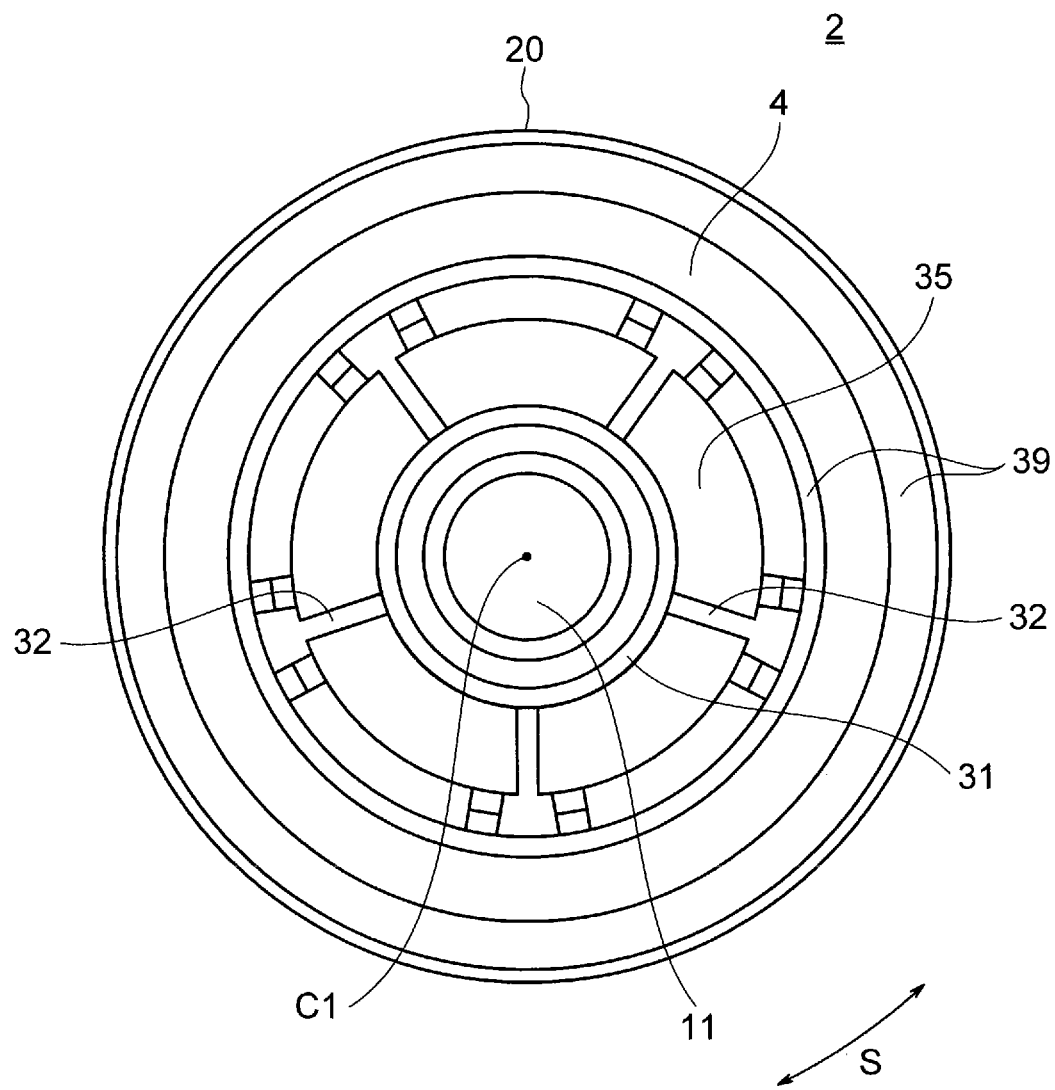
FIG. 7 is a rear view illustrating the rotor according to the first embodiment.

FIG. 7 is a diagram of the rotor 2 as seen from the counter-load side, that is, a rear view of the rotor 2. The end surface portion 39 covers the other end surface of the rotor core 20 in the axial direction and holds an annular sensor magnet 4 described below so that a surface of the sensor magnet 4 is exposed. However, the end surface portion 39 may entirely cover the sensor magnet 4.

As illustrated in FIG. 4, the sensor magnet 4 is disposed to face the rotor core 20 in the axial direction and is surrounded and held by the end surface portion 39. The sensor magnet 4 has magnetic poles of the same number as the number of poles of the rotor 2 (in this example, 10). The magnetic field of the sensor magnet 4 is detected by a magnetic sensor mounted on the substrate 6, so that the position of the rotor 2 in the circumferential direction (the rotational position) is detected. The sensor magnet 4 is also referred to as a position detecting magnet.

(Configuration for Suppressing Magnetic Flux Leakage)

Next, a configuration for suppressing magnetic flux leakage to the shaft 11 of the rotor 2 is described. The shaft 11 of the rotor 2 is made of a nonmagnetic material as described above, and more specifically made of, a stainless steel, a resin, or a ceramics.

Figure 8:
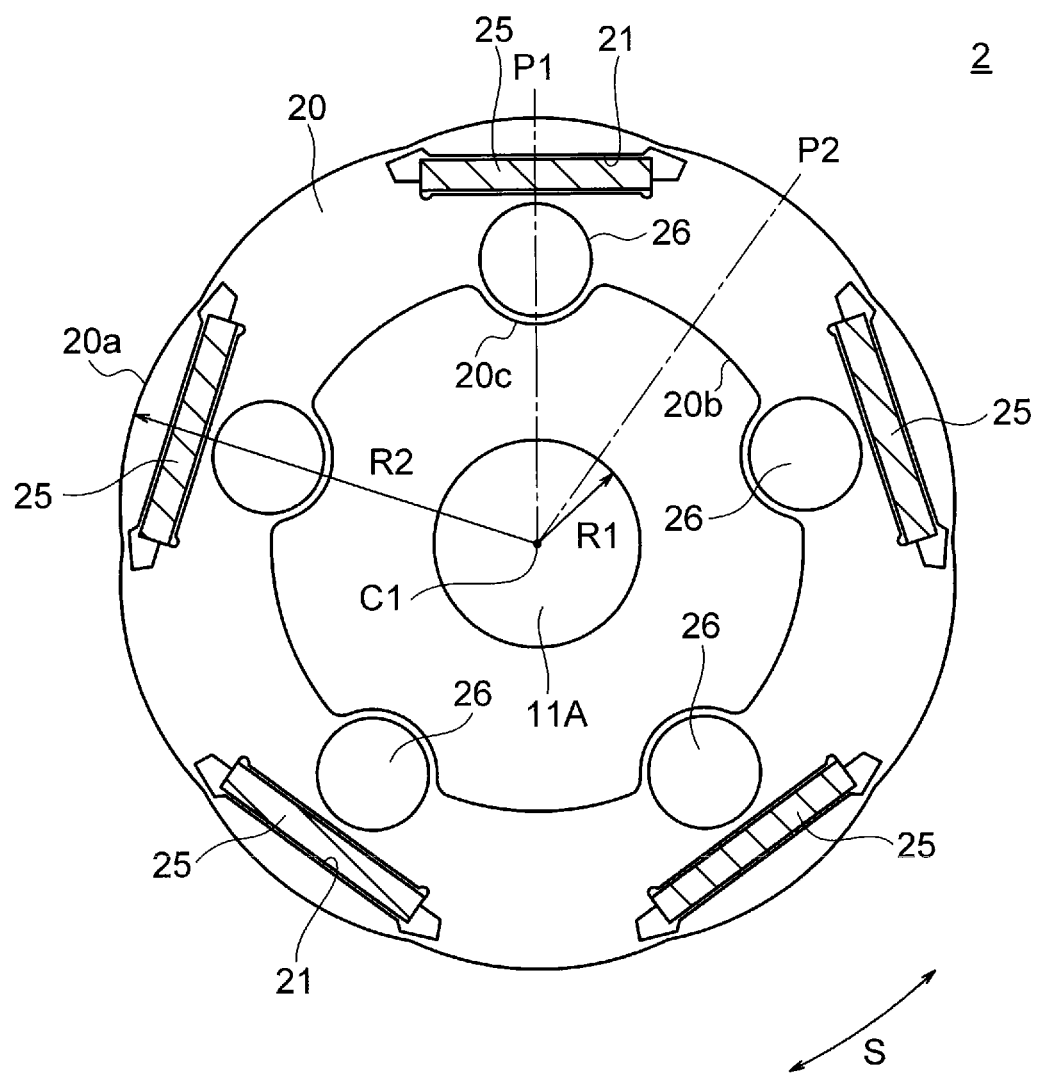
FIG. 8 is a diagram illustrating a first configuration example of the rotor according to the first embodiment, in which a separating portion is not illustrated.

FIG. 8 is a diagram illustrating the rotor 2 of a first configuration example of this embodiment. The separating portion is not illustrated in FIG. 8. The rotor 2 of the first configuration example includes the shaft 11 made of a stainless steel (referred to as a shaft 11A).

Figure 9:
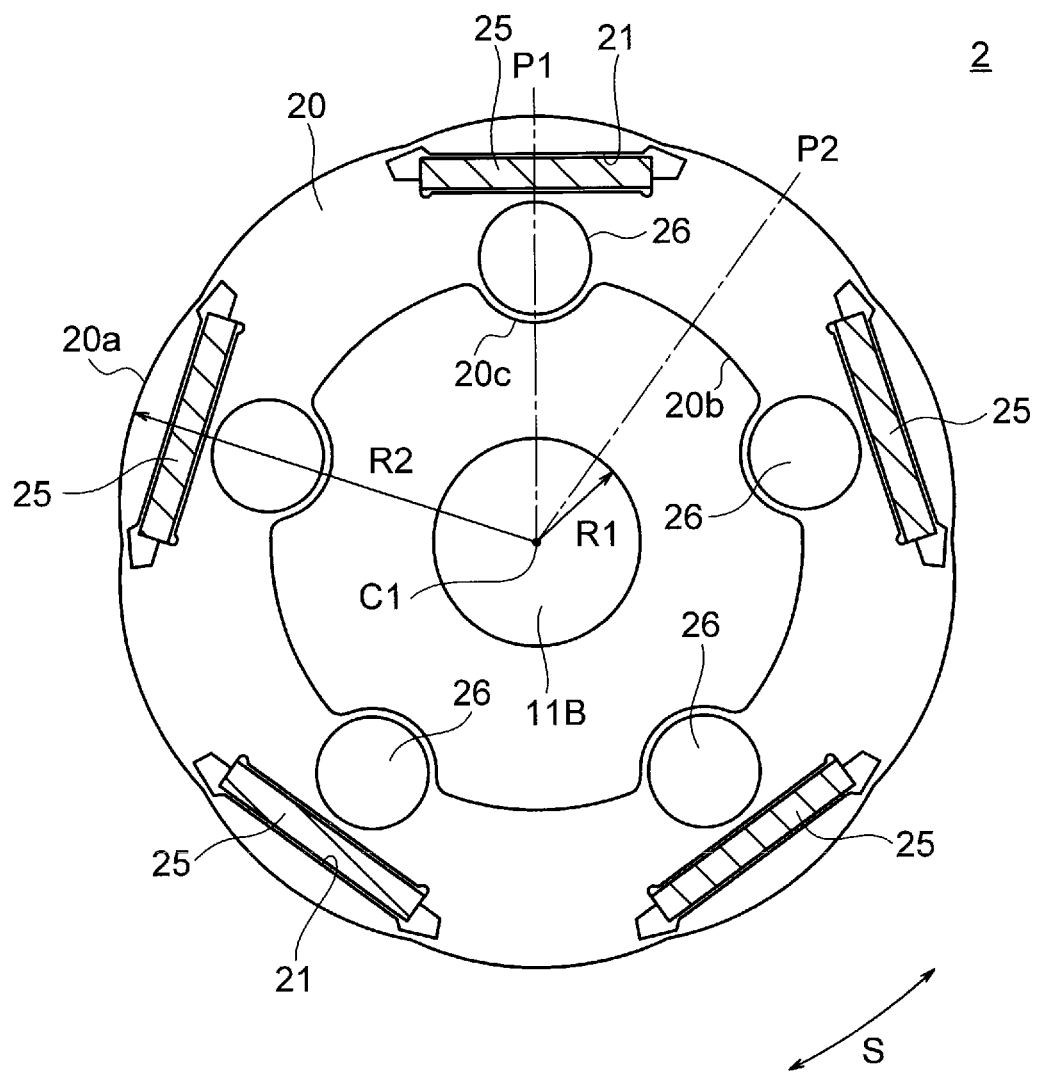
FIG. 9 is a diagram illustrating a second configuration example of the rotor according to the first embodiment, in which a separating portion is not illustrated.

FIG. 9 is a diagram illustrating the rotor 2 of a second configuration example of this embodiment. The separating portion is not illustrated in FIG. 9. The rotor 2 of the second configuration example includes the shaft 11 made of a resin (referred to as a shaft 11B). The resin constituting the shaft 11B is, for example, PBT. However, the resin constituting the shaft 11B is not limited to PBT. Any resin having comparable or higher strength (for example, a resin called engineering plastic) may be used.

Figure 10:
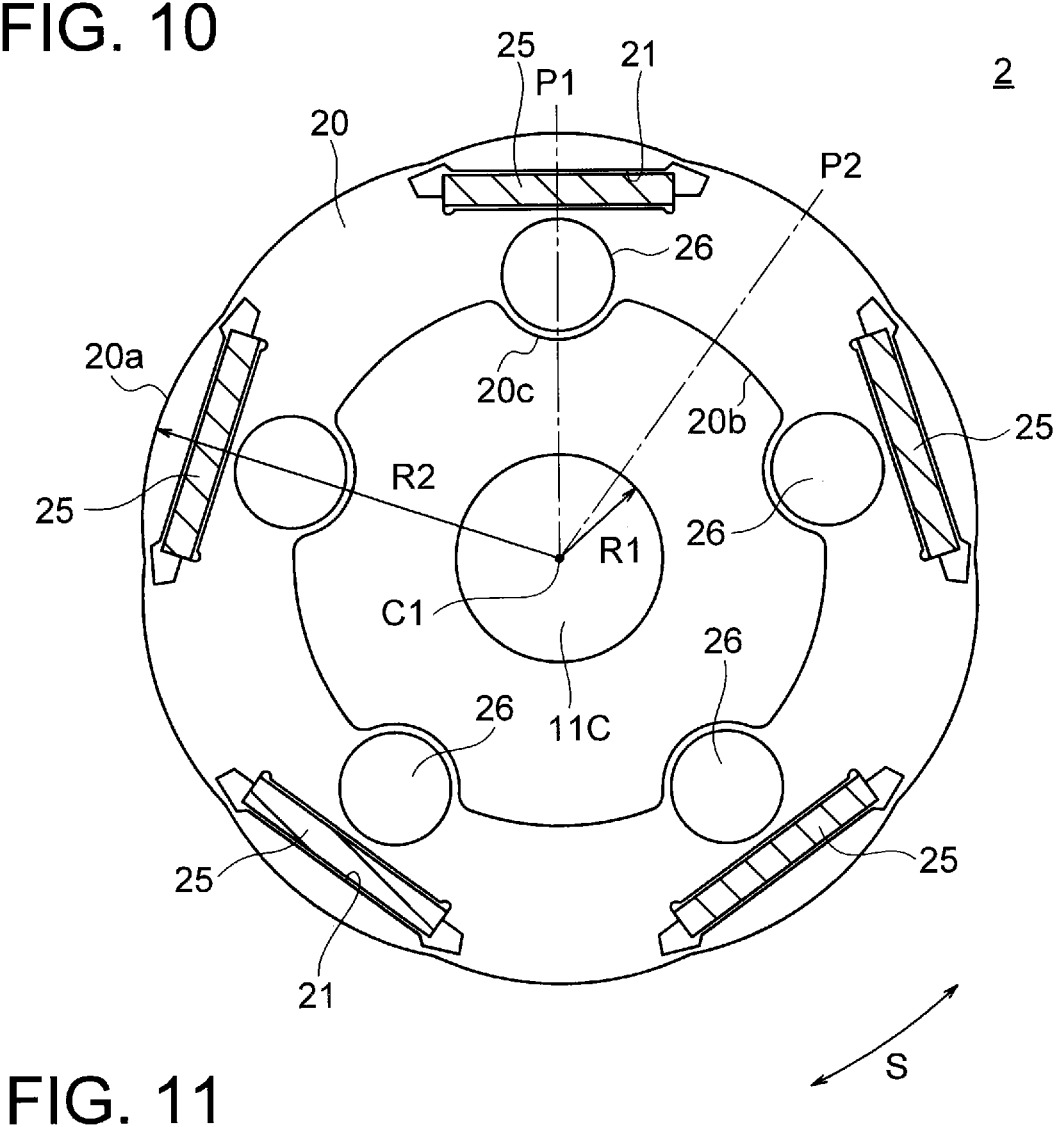
FIG. 10 is a diagram illustrating a third configuration example of the rotor according to the first embodiment, in which a separating portion is not illustrated.

FIG. 10 is a diagram illustrating the rotor 2 of a third configuration example of this embodiment. The separating portion is not illustrated in FIG. 10. The rotor 2 of the third configuration example includes the shaft 11 made of a ceramics (referred to as a shaft 11B). The ceramics constituting the shaft 11B is, for example, silicon carbide (SiC), silicon nitride ($Si_3N_4$), or alumina ($Al_2O_3$). However, the ceramics constituting the shaft 11C is not limited to silicon carbide, silicon nitride, or alumina. Any ceramics having comparable or higher strength may be used.

In FIGS. 8 to 10, the radius of the shaft 11 is represented by R1. The maximum distance from the center axis C1 to the outer circumference 20a of the rotor core 20 is represented by R2. The outer circumference 20a of the rotor core 20 has the above-described flower circle shape, and its outer diameter is maximum at the pole center of the magnetic pole P1 or P2. Therefore, the maximum distance R2 from the center axis C1 to the outer circumference 20a of the rotor core 20 is a distance from the center axis C1 to the outer circumference 20a at the pole center.

The rotors 2 of the first to third configuration examples illustrated in FIGS. 8 to 10 have a common configuration except for the material of the shaft 11. In any of the configuration examples, magnetic flux leakage from the rotor core 20 to the shaft 11 can be suppressed because the shaft 11 is made of the non-magnetic material.

In addition, since the shaft 11 and the rotor core 20 are separated from each other by the separating portion 3, the rotor core 20 needs less core material as compared with a general rotor in which a shaft is fitted into a center hole of a rotor core. Thus, the manufacturing cost can be reduced. Further, a shaft current is suppressed by electrical insulation property of the separating portion 3, and thus electrolytic corrosion can be suppressed.

In this example, the shaft 11 supports the rotor 2, and thus a load is applied to the shaft 11. For example, when the rotor core 20 is constituted by electromagnetic steel sheets having an outer diameter of 49 mm, a load of 1.2 kN is applied to the shaft 11. It is desirable that the shaft 11 has a larger outer diameter in order that the shaft 11 has sufficient strength.

However, the rotor core 20 needs to have a sufficient width in the radial direction in order to ensure the width of a magnetic path. When the separating portion 3 is provided between the shaft 11 and the rotor core 20, the outer diameter of the shaft 11 is limited. Therefore, the outer diameter of the shaft 11 needs to be determined in accordance with the material of the shaft 11 and the strength required for the shaft 11 of the rotor 2.

Accordingly, attention is focused on a value (R1/R2) obtained by dividing the radius R1 of the shaft 11 by the maximum distance R2 from the center axis C1 to the outer circumference 20a of the rotor core 20 here. How the strength (that is, withstand load) of the shaft 11 changes with change of the value of R1/R2 is analyzed using simulation for each material of the shaft 11.

Figure 11:
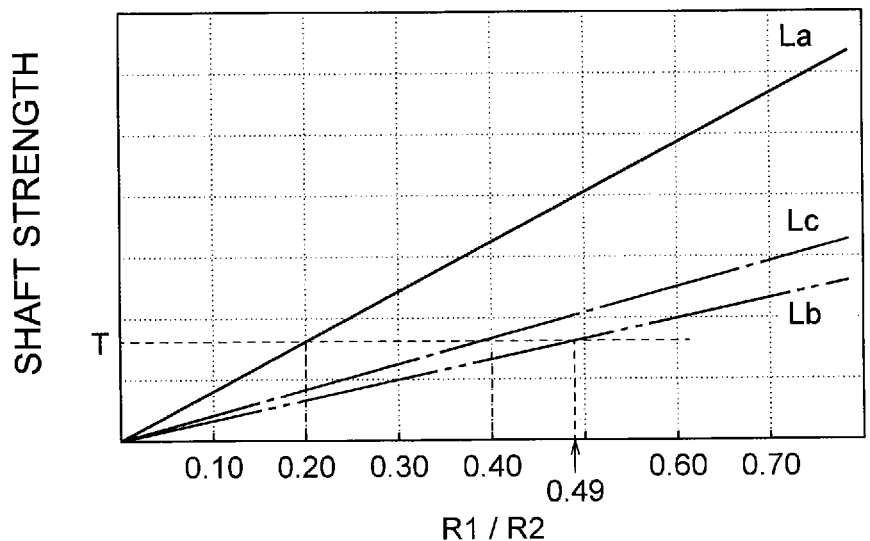
FIG. 11 is a graph showing a relation between R1/R2 and a strength of a shaft according to the first embodiment.

FIG. 11 is a graph showing a relation between R1/R2 and the strength of the shaft 11. The horizontal axis indicates R1/R2, and the vertical axis indicates the strength of the shaft 11. This graph is obtained by analyzing change of the strength of the shaft 11 when the value of R1 is changed while R2 is set to a fixed value and R2-R1 is set to a fixed value.

In FIG. 11, a solid straight line La represents the analysis result when the shaft 11A made of a stainless steel is used. A specific example of the stainless steel is SUS304. A straight line Lb shown with a long dashed double-short dashed line represents the analysis result when the shaft 11B made of a resin is used. A specific example of the resin is PBT. A straight line Lc shown with a long dashed short dashed line represents the analysis result when the shaft 11C made of a ceramics is used. A specific example of the ceramics is silicon nitride. In addition, the strength required for the shaft 11 of the rotor 2 is represented by reference character T on the vertical axis.

It is found from FIG. 11 that the shaft 11A made of a stainless steel (SUS304) provides the required strength T when R1/R2 is 0.20 or more. Although SUS304 is used here as an example of the stainless steel, comparable strength is also obtained by other stainless steel.

The shaft 11B made of a resin (PBT) provides the required strength T when R1/R2 is 0.49 or more. Although PBT is used here as an example of the resin, comparable strength is also obtained by other resin (in particular, a resin called engineering plastic).

The shaft 11C made of a ceramics (silicon carbide) provides the required strength T when R1/R2 is 0.40 or more. Although silicon carbide is used here as an example of the ceramics, comparable strength is also obtained by silicon nitride or alumina.

Next, in order to examine the upper limit of R1/R2, a relation between R1/R2 and an induced voltage is analyzed using simulation. An induced voltage is a voltage induced in the coil 53 of the stator 5 by a magnetic field (a rotating magnetic field) of the magnet 25 during rotation of the rotor 2. As the induced voltage increases, higher motor efficiency is obtained.

Figure 12:
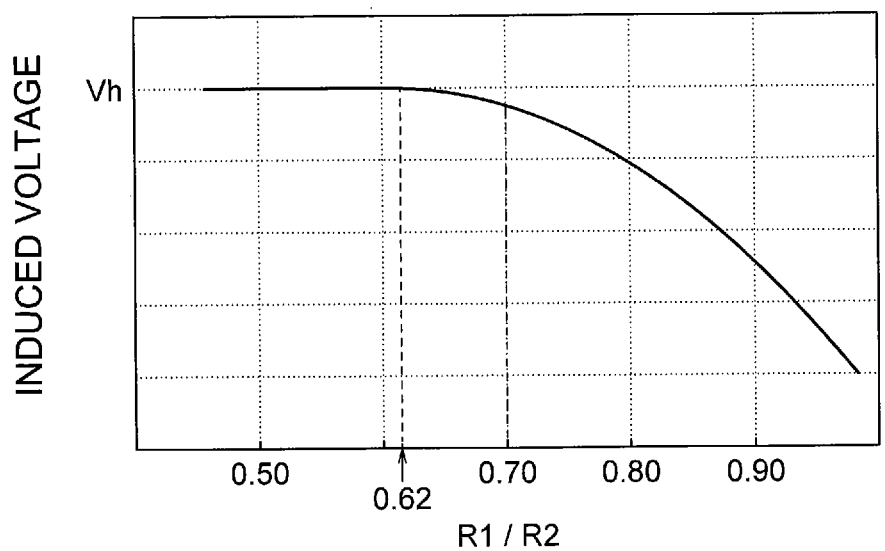
FIG. 12 is a graph showing a relation between R1/R2 and an induced voltage according to the first embodiment.

FIG. 12 is a graph showing a relation between R1/R2 and an induced voltage. The horizontal axis indicates R1/R2. The vertical axis indicates an induced voltage expressed as a relative value. The highest value of the induced voltage is represented by Vh. This graph is obtained by analyzing change of the induced voltage when R1 is changed while R2 is set to a fixed value and R2-R1 is set to a fixed value. The shafts 11A to 11C are all made of the non-magnetic material, and thus show common changes in the induced voltage.

It is apparent from FIG. 12 that the induced voltage reaches the highest value Vh when R1/R2 is 0.62 or less. When R1/R2 exceeds 0.62, the induced voltage starts to decrease. When R1/R2 exceeds 0.70, the induced voltage significantly decreases. In the curve shown in FIG. 12, a point at which R1/R2 is 0.70 corresponds to an inflection point.

This is because the width of the rotor core 20 in the radial direction is reduced as R1/R2 increases. A magnetic path through which the magnetic flux of the magnet 25 flows is formed in the rotor core 20. When R1/R2 is 0.70 or less (more desirably 0.62 or less, a sufficient width of the magnetic path can be obtained and the magnetic flux of the magnet 25 can be effectively used. On the other hand, when R1/R2 exceeds 0.70, the width of the magnetic path in the rotor core 20 decreases, and accordingly a part of the magnetic flux of the magnet 25 is not effectively used, so that the induced voltage decreases.

From this result, it is understood that, in order to improve the motor efficiency, R1/R2 is desirably 0.70 or less (more desirably 0.62 or less).

(Method of Manufacturing Rotor 2)

Next, a manufacturing method of the rotor 2 is described. The rotor 2 is manufactured by integrally molding the shaft 11 and the rotor core 20 with a resin. In this example, the sensor magnet 4 is also integrally molded together with the shaft 11 and the rotor core 20 with the resin. The shaft 11 is made of any of a stainless steel, a resin, and a ceramics, and a manufacturing process is the same for all these materials.

Figure 13:
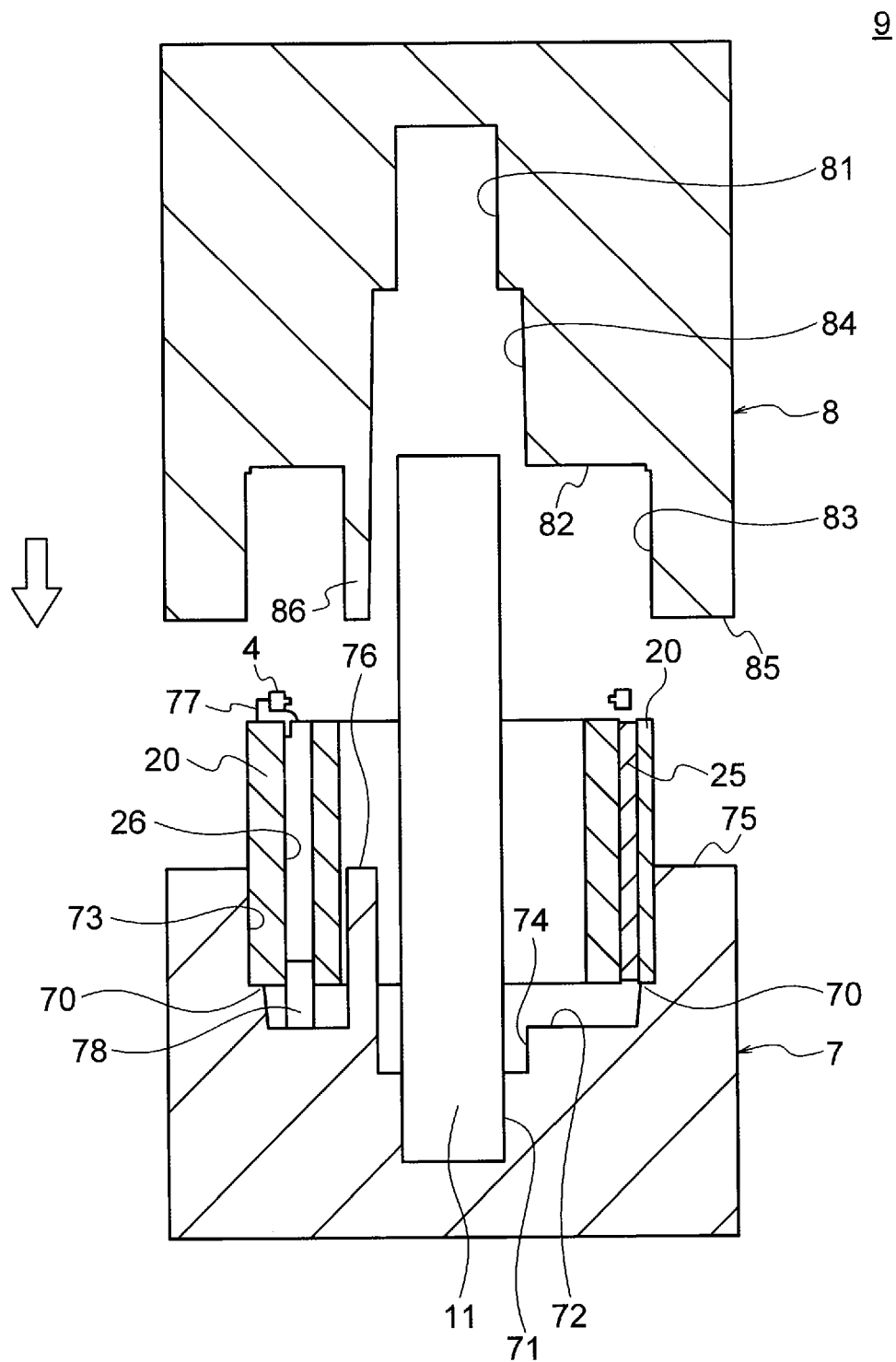
FIG. 13 is a longitudinal sectional view illustrating a molding mold according to the first embodiment.

FIG. 13 is a longitudinal sectional view illustrating the molding mold 9. The molding mold 9 includes a fixed mold (a lower mold) 7 and a movable mold (an upper mold) 8. The fixed mold 7 and the movable mold 8 respectively have mold mating surfaces 75 and 85 facing each other.

The fixed mold 7 has a shaft insertion hole 71 into which one end portion of the shaft 11 is inserted, a rotor-core insertion portion 73 into which the rotor core 20 is inserted, a facing surface 72 that faces an end surface (in this example, a lower surface) of the rotor core 20 in the axial direction, a contact portion 70 that is in contact with an outer circumferential portion of the end surface of the rotor core 20 in the axial direction, a cylindrical portion 74 that faces the outer circumferential surface of the shaft 11, cavity forming portions 76 that are inserted into inside of the rotor core 20, and the positioning pins (protrusions) 78 that protrude from the facing surface 72. The number of pins 78 may be any number equal to or smaller than the number of core holes 26 of the rotor core 20.

The movable mold 8 has a shaft insertion hole 81 into which the other end portion of the shaft 11 is inserted, a rotor-core insertion portion 83 into which the rotor core 20 is inserted, a facing surface 82 that faces an end surface (in this example, an upper surface) of the rotor core 20 in the axial direction, a cylindrical portion 84 that faces the circumference of the shaft 11, and cavity forming portions 86 that are inserted into inside of the rotor core 20.

Figure 14:
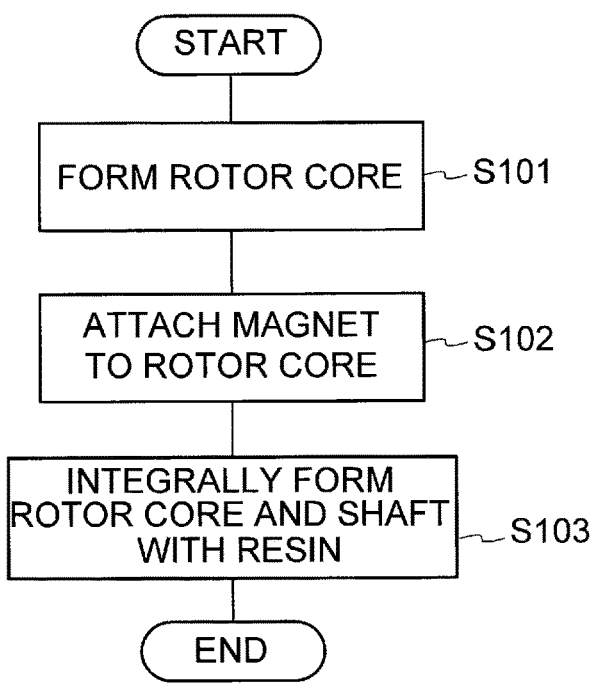
FIG. 14 is a flowchart illustrating a manufacturing process of the rotor according to the first embodiment.

FIG. 14 is a flowchart illustrating the manufacturing process of the rotor 2. First, electromagnetic steel sheets are stacked and are fixed by crimping or the like to form the rotor core 20 (Step S101). The magnets 25 are then inserted into the magnet insertion holes 21 of the rotor core 20 (Step S102).

Next, the rotor core 20 and the shaft 11 are placed in the molding mold 9, and integrally molded with the resin such as PBT (Step S103). Specifically, in FIG. 13, the shaft 11 is inserted into the shaft insertion hole 71 of the fixed mold 7, and the rotor core 20 is inserted into the rotor-core insertion portion 73.

At this time, the pins 78 of the fixed mold 7 engage with the core holes 26 of the rotor core 20. By the engagement of the pins 78 and the core holes 26, the rotor core 20 is positioned in the molding mold 9. The number of pins 78 of the fixed mold 7 is the same as the number of core holes 26 of the rotor core 20 (for example, five) in this example, and the pins 78 are arranged in a similar manner to the core holes 26. However, the number of pins 78 may be smaller than the number of core holes 26.

The core holes 26 of the rotor core 20 are disposed at equal distances from the center axis C1, and are disposed at the same relative positions with respect to the closest magnetic poles, as described above. Therefore, even when the position of the rotor core 20 is changed in the circumferential direction, the core holes 26 and the pins 78 can be engaged with each other.

Further, the sensor magnet 4 is placed on the rotor core 20 via a support 77, as illustrated in FIG. 13. The support 77 is made of a resin such as PBT, and is provided for positioning the sensor magnet 4 with respect to the rotor core 20 in molding. The support 77 is integrated with the separating portion 3 after molding. The sensor magnet 4 may be positioned by another method without using the support 77.

Thereafter, the movable mold 8 is moved down as indicated by an arrow in FIG. 13, so that the mold mating surfaces 75 and 85 are brought into contact with each other. In a state where the mold mating surfaces 75 and 85 are in contact with each other, a gap is formed between the lower surface of the rotor core 20 and the facing surface 72, and a gap is also formed between the upper surface of the rotor core 20 and the facing surface 82.

In this state, the molding mold 9 is heated and the molten resin such as PBT is injected through a runner. The resin is filled inside the rotor core 20 inserted in the rotor-core insertion portions 73 and 83, filled in the magnet insertion holes 21, and is filled in the core holes 26. The resin is also filled in spaces inside the cylindrical portions 74 and 84 and is further filled in the gaps between the facing surfaces 72 and 82 and the rotor core 20.

Thereafter, the molding mold 9 is cooled. Consequently, the resin in the molding mold 9 is hardened, so that the separating portion 3 is formed. That is, the shaft 11, the rotor core 20, and the sensor magnet 4 are integrated by the separating portion 3, and thus the rotor 2 is formed.

Specifically, the resin hardened between the cylindrical portions 74 and 84 of the molding mold 9 and the shaft 11 forms the inner annular portion 31 (FIG. 5). The resin hardened on the inner circumferential side of the rotor core 20 (except portions where the cavity forming portions 76 and 86 are disposed) forms the inner annular portion 31, the ribs 32, and the outer annular portion 33 (FIG. 5). Portions corresponding to the cavity forming portions 76 and 86 of the molding mold 9 form the cavities 35 (FIG. 5).

Moreover, the resin hardened between the facing surfaces 72 and 82 of the molding mold 9 and the rotor core 20 forms the end surfaces 38 and 39 (FIG. 4). Among portions of the end surface portion 38 which correspond to the core holes 26 of the rotor core 20, portions with which the pins 78 of the molding mold 9 engage form the resin holes 37 (FIG. 6) because the resin does not enter into these portions.

Thereafter, the movable mold 8 is moved up, and the rotor 2 is taken out from the fixed mold 7. Consequently, manufacturing of the rotor 2 is completed.

Meanwhile, the stator core 51 is formed by stacking electromagnetic steel sheets and fixing them by crimping or the like. The insulating portion 52 is attached to the stator core 51, and the coil 53 is wound thereon. Consequently, the stator 5 is obtained. Further, the substrate 6 to which the lead wires 61 are assembled is attached to the stator 5. Specifically, projections provided on the separating portion 3 of the stator 5 are inserted into attachment holes of the substrate 6 and are welded by heat welding or ultrasonic welding, so that the substrate 6 is fixed to the stator 5.

The stator 5 to which the substrate 6 is fixed is then placed in a mold, a resin (mold resin) such as BMC is injected into the molding mold, and the molding mold is heated, so that the mold resin portion 55 is formed. Consequently, the mold stator 50 is completed.

Thereafter, the bearings 12 and 13 are attached to the shaft 11 of the above-described rotor 2, and the shaft 11 is inserted into the hollow portion 56 through the opening 55b of the mold stator 50. Next, the bracket 15 is attached to the opening 55b of the mold stator 50. Further, the cap 14 is attached outside the bracket 15. Consequently, the motor 1 is completed.

Magnetization of the magnets 25 may be performed after the rotor 2 is completed or after the motor 1 is completed. In a case where the magnetization of the magnets 25 is performed after completion of the rotor 2, a magnetizing apparatus is used. In a case where the magnetization of the magnets 25 is performed after completion of the motor 1, a magnetizing current is applied to the coil 53 of the stator 5. In this specification, a magnet before being magnetized (that is, a magnetic material) is also referred to as a magnet.

Although the positioning pins 78 are provided in the fixed mold 7 in the example illustrated in FIG. 13, they may be provided in the movable mold 8. In either case, the rotor core 20 can be positioned with respect to the molding mold 9.

Effects of Embodiment

As described above, the consequent pole rotor 2 of the first configuration example of the first embodiment includes the shaft 11A made of a stainless steel, the annular rotor core 20 that surrounds the shaft 11A, and the separating portion 3 provided therebetween. In addition, the radius R1 of the shaft 11A and the maximum distance R2 from the center axis C1 of the shaft 11A to the outer circumference 20a of the rotor core 20 satisfy R1/R2≥0.20.

Since the shaft 11A is made of a stainless steel, it is possible to suppress magnetic flux leakage to the shaft 11A. Moreover, since the separating portion 3 is provided between the shaft 11A and the rotor core 20, the rotor core 20 needs less core material and thus the manufacturing cost can be reduced. Further, electrolytic corrosion due to the shaft current can be suppressed by electrical insulation property of the separating portion 3. In addition, since the radius R1 of the shaft 11A and the maximum distance R2 from the center axis C1 to the outer circumference 20a of the rotor core 20 satisfy R1/R2≥0.20, sufficient strength of the shaft 11 can be obtained.

The consequent pole rotor 2 of the second configuration example of the first embodiment includes the shaft 11B made of a resin, the annular rotor core 20 that surrounds the shaft 11B, and the separating portion 3 provided therebetween. In addition, the radius R1 of the shaft 11B and the maximum distance R2 from the center axis C1 of the shaft 11B to the outer circumference 20a of the rotor core 20 satisfy R1/R2≥0.49.

Since the shaft 11B is made of a resin, it is possible to suppress magnetic flux leakage to the shaft 11B. Moreover, since the separating portion 3 is provided between the shaft 11B and the rotor core 20, the rotor core 20 needs less core material and thus the manufacturing cost can be reduced. Further, electrolytic corrosion due to the shaft current can be suppressed by electrical insulation property of the separating portion 3. In addition, since the radius R1 of the shaft 11B and the maximum distance R2 from the center axis C1 to the outer circumference 20a of the rotor core 20 satisfy R1/R2≥0.49, sufficient strength of the shaft 11B can be obtained.

The consequent pole rotor 2 of the third configuration example of the first embodiment includes the shaft 11C made of a ceramics, the annular rotor core 20 that surrounds the shaft 11C, and the separating portion 3 provided therebetween. In addition, the radius R1 of the shaft 11C and the maximum distance R2 from the center axis C1 of the shaft 11C to the outer circumference 20a of the rotor core 20 satisfy R1/R2≥0.40.

Since the shaft 11C is made of a ceramics, it is possible to suppress magnetic flux leakage to the shaft 11C. Moreover, since the separating portion 3 is provided between the shaft 11C and the rotor core 20, the rotor core 20 needs less core material and thus the manufacturing cost can be reduced. Further, electrolytic corrosion due to the shaft current can be suppressed by electrical insulation property of the separating portion 3. In addition, since the radius R1 of the shaft 11C and the maximum distance R2 from the center axis C1 to the outer circumference 20a of the rotor core 20 satisfy R1/R2≥0.40, sufficient strength of the shaft 11C can be obtained.

Further, since the radius R1 of the shaft 11C and the maximum distance R2 from the center axis C1 to the outer circumference 20a of the rotor core 20 satisfy R1/R2≤0.70, it is possible to ensure a sufficient width of the magnetic path in the rotor core 20, thereby improving use efficiency of magnetic flux of the magnets 25. Thus, the motor efficiency can be improved.

Furthermore, since the radius R1 of the shaft 11C and the maximum distance R2 from the center axis C1 to the outer circumference 20a of the rotor core 20 satisfy R1/R2≤0.62, it is possible to ensure a sufficient width of the magnetic path in the rotor core 20, thereby further improving the use efficiency of magnetic flux of the magnets 25. Thus, the motor efficiency can be further improved.

In addition, since the separating portion 3 includes the inner annular portion 31 that is in contact with the outer circumference of the shaft 11, the outer annular portion 33 that is in contact with the inner circumference 20b of the rotor core 20, and the ribs 32 that connect the inner annular portion 31 and the outer annular portion 33 to each other, the cavities 35 are formed between the ribs 32. Accordingly, material for forming the separating portion 3 can be reduced, and the manufacturing cost can be reduced. Further, since the resonance frequency of the rotor core 20 can be adjusted by the dimensions of the ribs 32, it is possible to suppress vibration and noise in, for example, a fan or the like.

Furthermore, since the separating portion 3 is made of a resin, the weight of the rotor 2 can be reduced. In addition, since the separating portion 3 can be formed by integrally molding the shaft 11, the rotor core 20, and the magnet 25 with the resin, the manufacturing process can be simplified.

Since the rotor core 20 has the core holes 26 in the end surface in the axial direction, the pins 78 provided in the molding mold 9 are allowed to engage with the core holes 26, thereby positioning the rotor core 20. Moreover, since part of the resin constituting the separating portion 3 enters into the core holes 26, misalignment between the rotor core 20 and the separating portion 3 in the circumferential direction can be prevented.

Since each core hole 26 is located on the inner side in the radial direction of the pole center of the first magnetic pole P1 or the second magnetic pole P2, the flow of magnetic flux in the rotor core 20 can be rectified. Thus, imbalance of magnetic force can be suppressed, and vibration and noise can be suppressed.

Since the cross-sectional shape of the core hole 26 is circular, the pin 78 of the molding mold 9 engaging with the core hole 26 can have a simple shape, and thus the manufacturing cost can be reduced.

The core holes 26 of the rotor core 20 are disposed at equal distances from the center axis C1, and are disposed at the same relative positions with respect to the closest magnetic poles. Therefore, even when the position of the rotor core 20 is changed in the circumferential direction in the molding mold 9, the core holes 26 and the pins 78 can be engaged with each other.

In addition, in the manufacturing process of the rotor 2, the shaft 11 and the rotor core 20 are integrally molded with a resin. Thus, a process of press fitting the shaft 11 or the like is eliminated, and the manufacturing process of the rotor 2 can be simplified. Moreover, in the molding process, the rotor core 20 can be positioned in the molding mold 9 by causing the pins 78 of the molding mold 9 to engage with the core holes 26 of the rotor core 20.

First Modification

Figure 15:
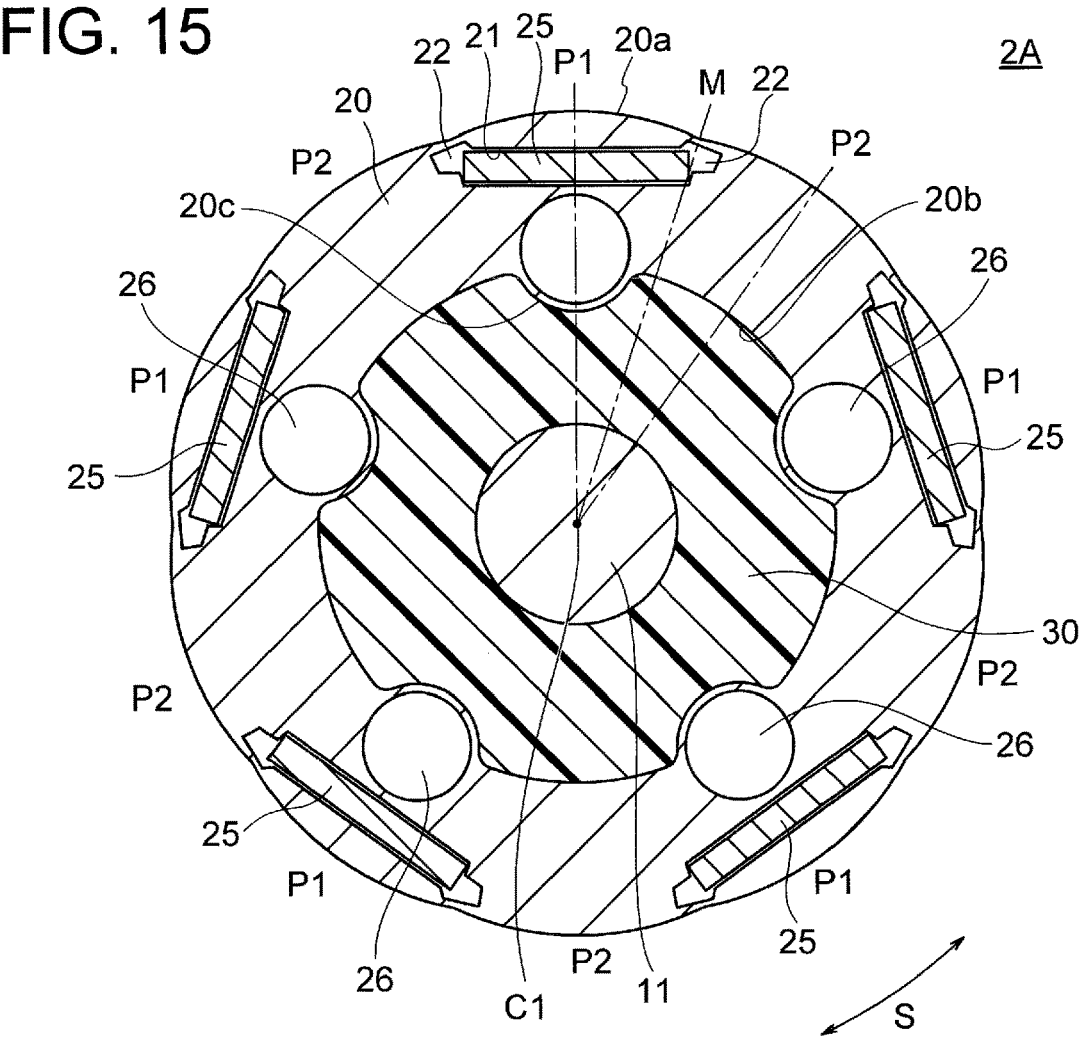
FIG. 15 is a sectional view illustrating a rotor according to a first modification of the first embodiment.

FIG. 15 is a sectional view illustrating a rotor 2A according to a first modification of the first embodiment and corresponds to a sectional view taken along line 5-5 in FIG. 3 as seen in the direction indicated by arrows. The rotor 2A of this modification is different from the rotor 2 of the first embodiment in that a separating portion 30 between the shaft 11 and the rotor core 20 does not have the ribs 32 (FIG. 5).

The separating portion 30 of the rotor 2A of the first modification is filled between the shaft 11 and the rotor core 20. The outer circumference of the separating portion 30 is in contact with the inner circumference 20b of the rotor core 20, and the inner circumference of the separating portion 30 is in contact with the outer circumference of the shaft 11. The separating portion 30 is formed by integrally molding the shaft 11, the rotor core 20, and the magnets 25 with the resin, as is the case with the separating portion 3 in the first embodiment.

The shaft 11 is made of a non-magnetic material such as a stainless steel, a resin, or a ceramics. The relation between the radius R1 of the shaft 11 and the maximum distance R2 from the center axis C1 to the outer circumference 20a of the rotor core 20 is as described in the first embodiment. The rotor 2A of the first modification is configured in a similar to the rotor 2 of the first embodiment except for the configuration of the separating portion 30.

Also in the first modification, leakage magnetic flux from the rotor core 20 to the shaft 11 can be suppressed because the shaft 11 is made of a non-magnetic material as in the first embodiment. Further, electrolytic corrosion can be suppressed because the separating portion 30 has electric insulation property.

Second Modification

Figure 16:
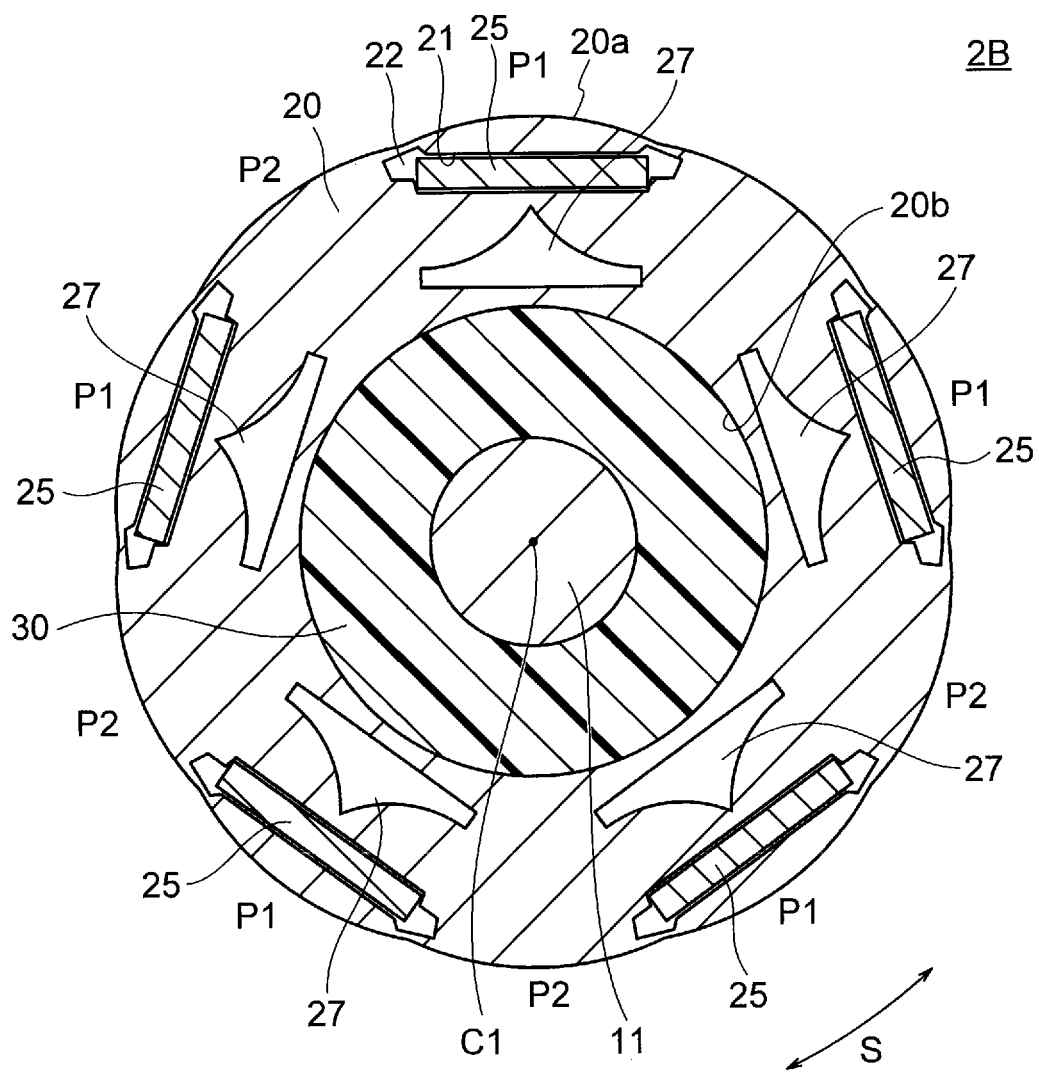
FIG. 16 is a sectional view illustrating a rotor according to a second modification of the first embodiment.

FIG. 16 is a sectional view illustrating a rotor 2B according to a second modification of the first embodiment and corresponds to a sectional view taken along line 5-5 in FIG. 3 as seen in the direction indicated by arrows. In the rotor 2B of this modification, the shape of each core hole 27 of the rotor core 20 is different from either of the core hole 26 in the first embodiment and the core hole 26 in the first modification.

Each of the core hole 26 in the first embodiment (FIG. 5) and the core hole 26 in the first modification (FIG. 15) has a circular cross-sectional shape. On the other hand, the core hole 27 in the second modification has a vertex facing the pole center (that is, the center in the circumferential direction) of the first magnetic pole P1, and has a shape that spreads like a fan in the circumferential direction from the vertex toward the inner side in the radial direction.

Figure 17:
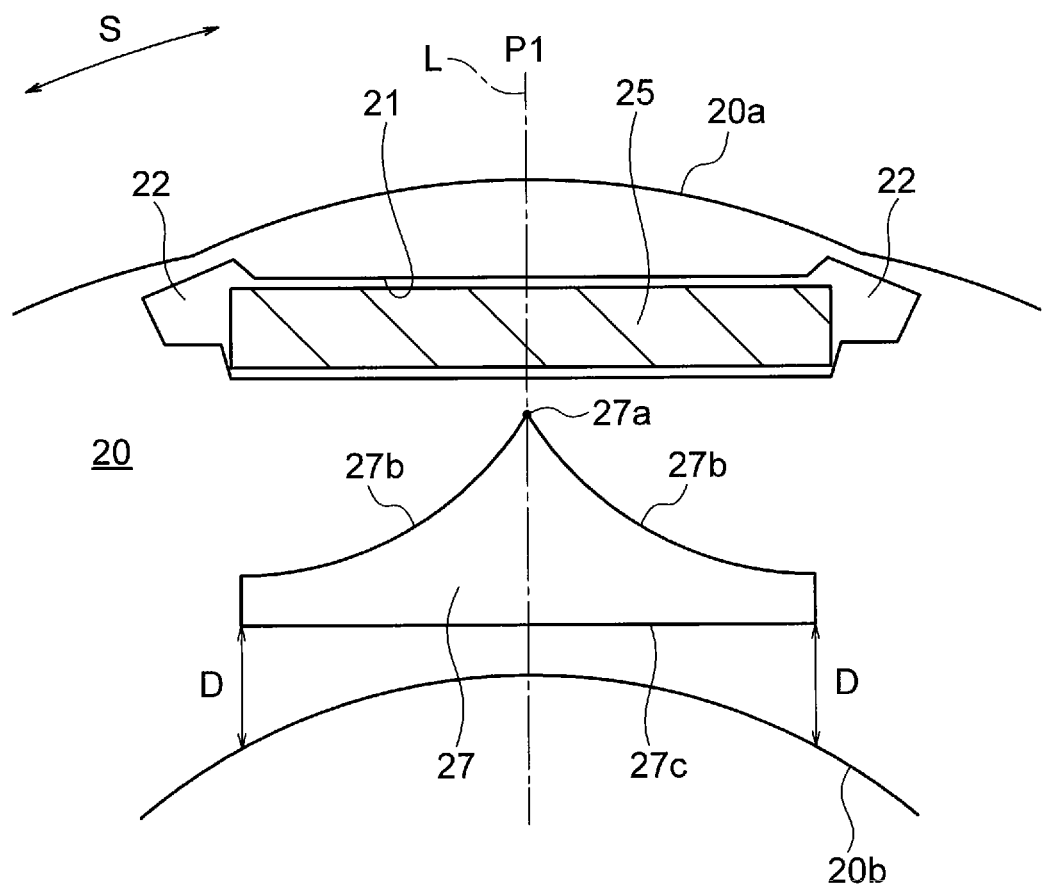
FIG. 17 is an enlarged sectional view illustrating the rotor according to the second modification of the first embodiment.

FIG. 17 is an enlarged view illustrating a portion of the rotor core 20 which includes the core hole 27. In FIG. 17, a straight line in the radial direction which indicates the pole center of the first magnetic pole P1 is defined as a pole center line L. The core hole 27 has a vertex (a facing portion) 27a facing the pole center of the first magnetic pole P1, a pair of curved side edges 27b each of which extends from the vertex 27a so that a distance from the pole center line L in the circumferential direction increases toward an inner side in the radial direction, and an inner edge 27c that extends along the inner circumference 20b of the rotor core 20.

The side edges 27b of the core hole 27 are curved so as to guide magnetic flux, which flows from the first magnetic pole P1 to the inner side in the radial direction, to both sides of the pole center line L in the circumferential direction. Therefore, the flow of magnetic flux in the rotor core 20 can be rectified. Accordingly, imbalance of magnetic force due to disturbance of magnetic flux can be reduced, and vibration and noise can be reduced.

The inner edge 27c of the core hole 27 extends along the inner circumference 20b of the rotor core 20. The inner circumference 20b of the rotor core 20 does not have the protrusions 20c described in the first embodiment, and has a circular shape entirely. Both ends of the inner edge 27c in the circumferential direction are at the same distance D from the inner circumference 20b of the rotor core 20. Although the side edges 27b are apart from the inner edge 27c in FIG. 17, the side edges 27b may be in contact with the inner edge 27c.

The relation among the radius R1 of the shaft 11 and the maximum distance R2 from the center axis C1 to the outer circumference 20a of the rotor core 20 is as described in the first embodiment.

The rotor 2B of the second modification is configured in a similar manner to the rotor 2 of the first embodiment except for the shapes of the core holes 27 of the rotor core 20 and the inner circumference 20b that does not include the protrusions 20c. In FIG. 16, the rotor 2B includes the separating portion 30 which is the same as that in the first modification, but the rotor 2B may include the separating portion 3 (FIG. 5) having the ribs 32 described in the first embodiment.

In the second modification, the core hole 27 has the vertex 27a facing the pole center of the first magnetic pole P1 and has a shape that spreads in the circumferential direction from the vertex 27a to the inner side in the radial direction, and thus the flow of magnetic flux from the first magnetic pole P1 can be rectified. Thus, imbalance of magnetic force can be reduced, and vibration and noise can be reduced.

Although the vertex 27a of the core hole 27 faces the pole center of the first magnetic pole P1 in this example, the vertex 27a may face the pole center of the second magnetic pole P2.

(Air Conditioner)

Next, an air conditioner to which the motor of the above-described first embodiment or any of the modifications is applicable is described. FIG. 18(A) is a diagram illustrating a configuration of an air conditioner 500 to which the motor 1 of the first embodiment is applied. The air conditioner 500 includes an outdoor unit 501, an indoor unit 502, and a refrigerant pipe 503 that connects the units 501 and 502.

The outdoor unit 501 includes an outdoor fan 510 that is, for example, a propeller fan. The indoor unit 502 includes an indoor fan 520 that is, for example, a cross flow fan. The outdoor fan 510 includes the blade 505 and the motor 1 driving the blade 505. The indoor fan 520 includes a blade 521 and the motor 1 driving the blade 521. Each of the motors 1 has the configuration described in the first embodiment. FIG. 18(A) also illustrates a compressor 504 that compresses refrigerant.

Figure 18B:
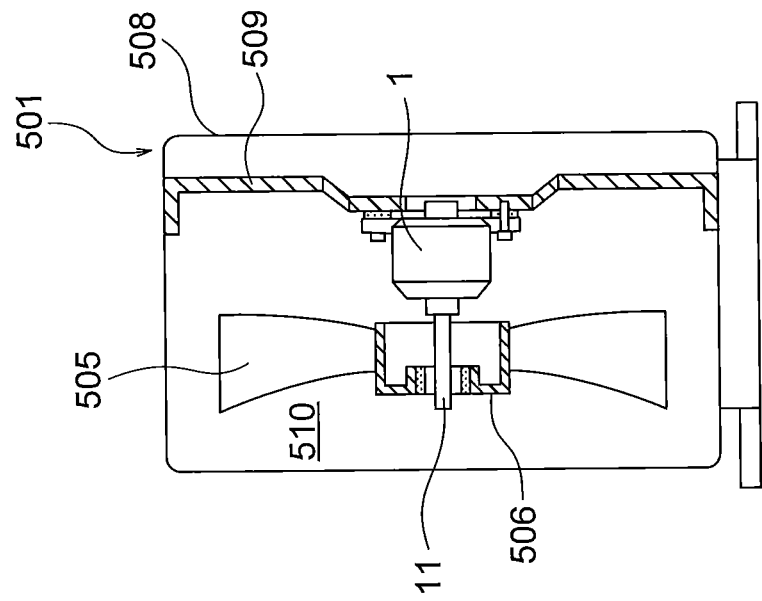
FIG. 18(B) is a sectional view illustrating an outdoor unit of the air conditioner.
Figure 18A:
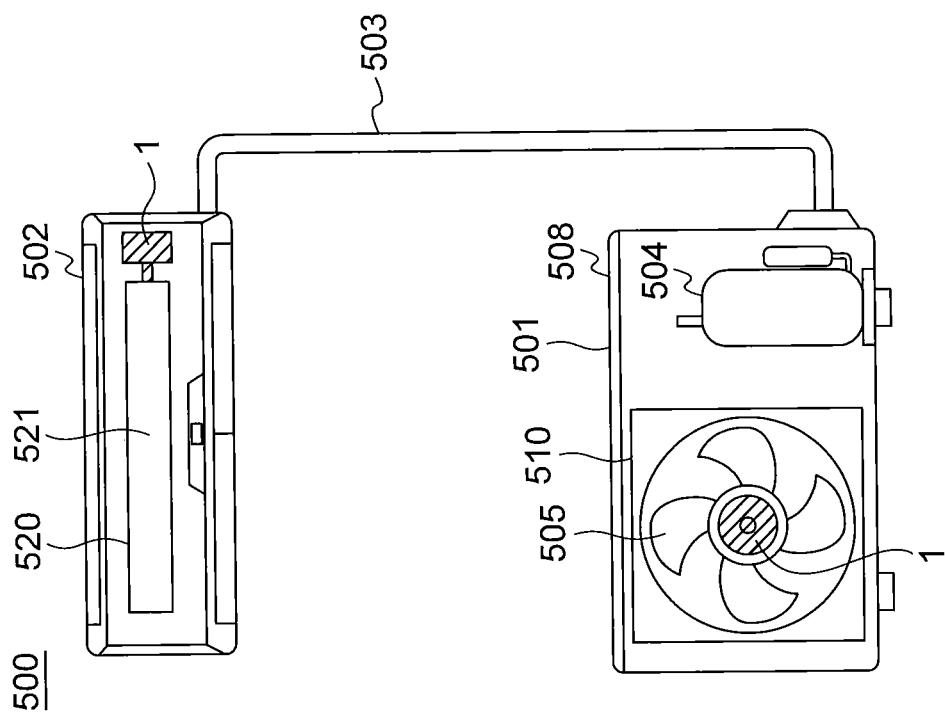
FIG. 18(A) is a diagram illustrating a configuration example of an air conditioner to which the motor of each of the first embodiment and the modifications is applicable.

FIG. 18(B) is a sectional view of the outdoor unit 501. The motor 1 is supported by a frame 509 disposed in a housing 508 of the outdoor unit 501. The blade 505 is attached to the shaft 11 of the motor 1 via a hub 506.

In the outdoor fan 510, the blade 505 is rotated by rotation of the rotor 2 of the motor 1, and sends air to the outdoors. During a cooling operation of the air conditioner 500, heat discharged when refrigerant compressed in the compressor 504 is condensed in a condenser (not illustrated) is discharged to the outdoors by air-blowing of the outdoor fan 510.

Similarly, in the indoor fan 520 (FIG. 18(A)), the blade 521 is rotated by rotation of the rotor 2 of the motor 1, and supplies air to the indoors. During the cooling operation of the air conditioner 500, air from which heat is taken when refrigerant is evaporated in an evaporator (not illustrated) is supplied to the indoors by air-blowing of the indoor fan 520.

The motor 1 of the above-described first embodiment has high motor efficiency by suppressing magnetic flux leakage, and therefore operation efficiency of the air conditioner 500 can be improved. Moreover, since the resonance frequency of the motor 1 is adjustable, resonance of the motor 1 and the blade 505 (520), resonance of the entire outdoor unit 501, and resonance of the entire indoor unit 502 can be suppressed, so that noise can be reduced.

The rotor 2A of the first modification (FIG. 15) or the rotor 2B of the second modification (FIG. 16) may be used in the motor 1. Further, although the motor 1 is used as a driving source of each of the outdoor fan 510 and the indoor fan 520 here, it is sufficient that the motor 1 is used as a driving source of at least one of the outdoor fan 510 and the indoor fan 520.

In addition, the motors 1 described in the first embodiment and its modifications are also applicable to electric appliances other than a fan of an air conditioner.

Although the preferred embodiment of the present invention has been described in detail above, the present invention is not limited thereto, and various improvements or modifications may be made without departing from the gist of the present invention.

What is claimed is:

1. A rotor comprising:
   a shaft made of a resin;
   an annular rotor core surrounding the shaft from an outer side in a radial direction about a center axis of the shaft;
   a magnet attached to the rotor core; and
   a separating portion provided between the shaft and the rotor core and having electric insulation property,
   wherein the magnet constitutes a first magnetic pole, and a part of the rotor core constitutes a second magnetic pole,
   wherein the rotor core has an inner circumference facing the shaft and an outer circumference opposite to the inner circumference, and
   wherein a radius R1 of the shaft and a maximum distance R2 from the center axis to the outer circumference of the rotor core satisfy:

$R1/R2 \geq 0.49$.

2. The rotor according to claim 1, wherein the radius R1 and the maximum distance R2 satisfy $R1/R2 \leq 0.62$.

3. The rotor according to claim 1, wherein the radius R1 and the maximum distance R2 satisfy $R1/R2 \leq 0.70$.

4. The rotor according to claim 1, wherein the separating portion has an inner annular portion that is in contact with an outer circumference of the shaft, an outer annular portion that is in contact with the inner circumference of the rotor core, and ribs connecting the inner annular portion and the outer annular portion.

5. The rotor according to claim 1, wherein the separating portion is made of a resin.

6. The rotor according to claim 1, wherein the rotor core has a core hole in an end surface of the rotor core in a direction of the center axis.

7. The rotor according to claim 6, wherein the core hole is formed on an inner side in the radial direction with respect to a center of the first magnetic pole or the second magnetic pole in a circumferential direction about the center axis.

8. The rotor according to claim 7, wherein the core hole has a circular shape.

9. The rotor according to claim 7, wherein the core hole has a facing portion that faces the center of the first magnetic pole or the second magnetic pole in the circumferential direction, and has a shape that spreads in the circumferential direction from the facing portion toward an inner side in the radial direction.

10. The rotor according to claim 1, wherein the rotor core has a plurality of core holes in an end surface of the rotor core in a direction of the center axis, the core holes being disposed at equal distances from the center axis, and
   wherein the core holes are disposed at the same relative positions with respect to closest magnetic poles.

11. The rotor according to claim 10, wherein the separating portion has an end surface portion that covers at least a part of the end surface of the rotor core in the direction of the center axis, and
   wherein the end surface portion has one or more holes the number of which is equal to or smaller than the number of the core holes.

12. A motor comprising:
   the rotor according to claim 1; and
   a stator provided to surround the rotor from the outer side in the radial direction.

13. A fan comprising:
   the motor according to claim 12, and
   a blade rotated by the motor.

14. An air conditioner comprising an outdoor unit, an indoor unit, and a refrigerant pipe connecting the outdoor unit and the indoor unit,
   wherein at least one of the outdoor unit and the indoor unit comprises the fan according to claim 13.

15. A rotor comprising:
   a shaft made of a ceramics;
   an annular rotor core surrounding the shaft from an outer side in a radial direction about a center axis of the shaft;
   a magnet attached to the rotor core; and
   a separating portion provided between the shaft and the rotor core and having electric insulation property,
   wherein the magnet constitutes a first magnetic pole, and a part of the rotor core constitutes a second magnetic pole,
   wherein the rotor core has an inner circumference facing the shaft and an outer circumference opposite to the inner circumference, and
   wherein a radius R1 of the shaft and a maximum distance R2 from the center axis to the outer circumference of the rotor core satisfy:

$R1/R2 \geq 0.40$.

16. The rotor according to claim 15, wherein the radius R1 and the maximum distance R2 satisfy $R1/R2 \leq 0.62$.

17. The rotor according to claim 15, wherein the radius R1 and the maximum distance R2 satisfy $R1/R2 \leq 0.70$.

18. The rotor according to claim 15, wherein the separating portion has an inner annular portion that is in contact with an outer circumference of the shaft, an outer annular portion that is in contact with the inner circumference of the rotor core, and ribs connecting the inner annular portion and the outer annular portion.

19. The rotor according to claim 15, wherein the separating portion is made of a resin.

20. The rotor according to claim 15, wherein the rotor core has a core hole in an end surface of the rotor core in a direction of the center axis.

21. The rotor according to claim 20, wherein the core hole is formed on an inner side in the radial direction with respect to a center of the first magnetic pole or the second magnetic pole in a circumferential direction about the center axis.

22. The rotor according to claim 21, wherein the core hole has a circular shape.

23. The rotor according to claim 21, wherein the core hole has a facing portion that faces the center of the first magnetic pole or the second magnetic pole in the circumferential direction, and has a shape that spreads in the circumferential direction from the facing portion toward an inner side in the radial direction.

24. The rotor according to claim 15, wherein the rotor core has a plurality of core holes in an end surface of the rotor core in a direction of the center axis, the core holes being disposed at equal distances from the center axis, and
wherein the core holes are disposed at the same relative positions with respect to closest magnetic poles.

25. The rotor according to claim 24, wherein the separating portion has an end surface portion that covers at least a part of the end surface of the rotor core in the direction of the center axis, and
wherein the end surface portion has one or more holes the number of which is equal to or smaller than the number of the core holes.

26. A motor comprising:
the rotor according to claim 15; and
a stator provided to surround the rotor from the outer side in the radial direction.

27. A fan comprising:
the motor according to claim 26, and
a blade rotated by the motor.

28. An air conditioner comprising an outdoor unit, an indoor unit, and a refrigerant pipe connecting the outdoor unit and the indoor unit,
wherein at least one of the outdoor unit and the indoor unit comprises the fan according to claim 27.

29. A manufacturing method of a rotor, the method comprising the steps of:
preparing an annular rotor core to which a magnet constituting a first magnetic pole is attached and which has a part constituting a second magnetic pole, and a shaft made of a resin; and
forming a separating portion using an electrically insulating resin between the shaft and the rotor core by placing the shaft and the rotor core in a molding mold so that the rotor core surrounds the shaft,
wherein a radius R1 of the shaft and a maximum distance R2 from a center axis of the shaft to an outer circumference of the rotor core satisfy:
$R1/R2 \geq 0.49$.

30. The manufacturing method of a rotor according to claim 29,
wherein the rotor core has a core hole in an end surface of the rotor core in a direction of the center axis of the shaft, and
wherein, in the step of forming the separating portion, a protrusion provided in the molding mold is engaged with the core hole of the rotor core.

31. A manufacturing method of a rotor, the method comprising the steps of:
preparing an annular rotor core to which a magnet constituting a first magnetic pole is attached and which has a part constituting a second magnetic pole, and a shaft made of a ceramics, and
forming a separating portion using an electrically insulating resin between the shaft and the rotor core by placing the shaft and the rotor core in a molding mold so that the rotor core surrounds the shaft,
wherein a radius R1 of the shaft and a maximum distance R2 from a center axis of the shaft to an outer circumference of the rotor core satisfy:
$R1/R2 \geq 0.40$.

32. The manufacturing method of a rotor according to claim 31,
wherein the rotor core has a core hole in an end surface of the rotor core in a direction of the center axis of the shaft, and
wherein, in the step of forming the separating portion, a protrusion provided in the molding mold is engaged with the core hole of the rotor core.

* * * * *